United States Patent
Mine et al.

(10) Patent No.: US 11,275,289 B2
(45) Date of Patent: Mar. 15, 2022

(54) IMAGE PICKUP APPARATUS THAT CONTROLS FLASH EMISSION AMOUNT AT PHOTOGRAPHING AND CONTROL METHOD THEREFOR

(71) Applicant: CANON KABUSHIKI KAISHA, Tokyo (JP)

(72) Inventors: Yosuke Mine, Tama (JP); Yuichi Ariga, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/984,612

(22) Filed: Aug. 4, 2020

(65) Prior Publication Data

US 2021/0063844 A1 Mar. 4, 2021

(30) Foreign Application Priority Data

Aug. 28, 2019 (JP) .............................. JP2019-155757

(51) Int. Cl.
*G03B 7/16* (2021.01)
*G03B 15/05* (2021.01)
(Continued)

(52) U.S. Cl.
CPC .............. *G03B 7/16* (2013.01); *G03B 15/05* (2013.01); *H04N 5/2256* (2013.01);
(Continued)

(58) Field of Classification Search
CPC .................................................. H04N 5/2354
See application file for complete search history.

(56) References Cited

U.S. PATENT DOCUMENTS

| 6,928,239 B2 * | 8/2005 | Fukui | ....................... G03B 7/16 |
| | | | 396/61 |
| 7,889,890 B2 * | 2/2011 | Miyazaki | ............. H04N 5/2354 |
| | | | 382/118 |

(Continued)

FOREIGN PATENT DOCUMENTS

| JP | 2004349837 A | * 12/2004 |
| JP | 2009100252 A | 5/2009 |

(Continued)

*Primary Examiner* — Clayton E. LaBalle
*Assistant Examiner* — Leon W Rhodes, Jr.
(74) *Attorney, Agent, or Firm* — Rossi, Kimms & McDowell LLP

(57) ABSTRACT

An image pickup apparatus that is capable of reducing influence of abnormal reflection light at pre-emission upon determination of an emission amount for main photographing. The image pickup apparatus calculates reflection luminances of reflected light from an object at pre-emission of a lighting device, detects a face area from an image, divides the face area into blocks, calculates a face reflection luminance from a weighted average of reflection luminances of the blocks and first weights of the blocks, calculates a face ambient light luminance from a weighted average of ambient light luminances of the object of the blocks and second weights of the blocks, and determines an emission amount of the lighting device for main photographing with using the face reflection luminance and the ambient light luminance. A first weight of an abnormal luminance block is reduced than that of a block other than the abnormal luminance block.

19 Claims, 18 Drawing Sheets

(51) Int. Cl.
*H05B 41/32* (2006.01)
*H04N 5/225* (2006.01)
*H04N 5/232* (2006.01)
*H04N 5/235* (2006.01)

(52) U.S. Cl.
CPC ....... *H04N 5/2354* (2013.01); *H04N 5/23219* (2013.01); *H05B 41/325* (2013.01)

(56) References Cited

U.S. PATENT DOCUMENTS

| | | | |
|---|---|---|---|
| 8,294,785 B2 * | 10/2012 | Chou | H04N 5/23219 348/230.1 |
| 8,463,119 B2 * | 6/2013 | Kubota | G03B 15/05 396/159 |
| 10,063,826 B2 * | 8/2018 | Kitajima | H04N 9/77 |
| 10,908,478 B2 * | 2/2021 | Yoshino | G02B 7/28 |

FOREIGN PATENT DOCUMENTS

| | | | |
|---|---|---|---|
| JP | 2013005325 A | * | 1/2013 |
| JP | 2017208664 A | * | 11/2017 |

* cited by examiner

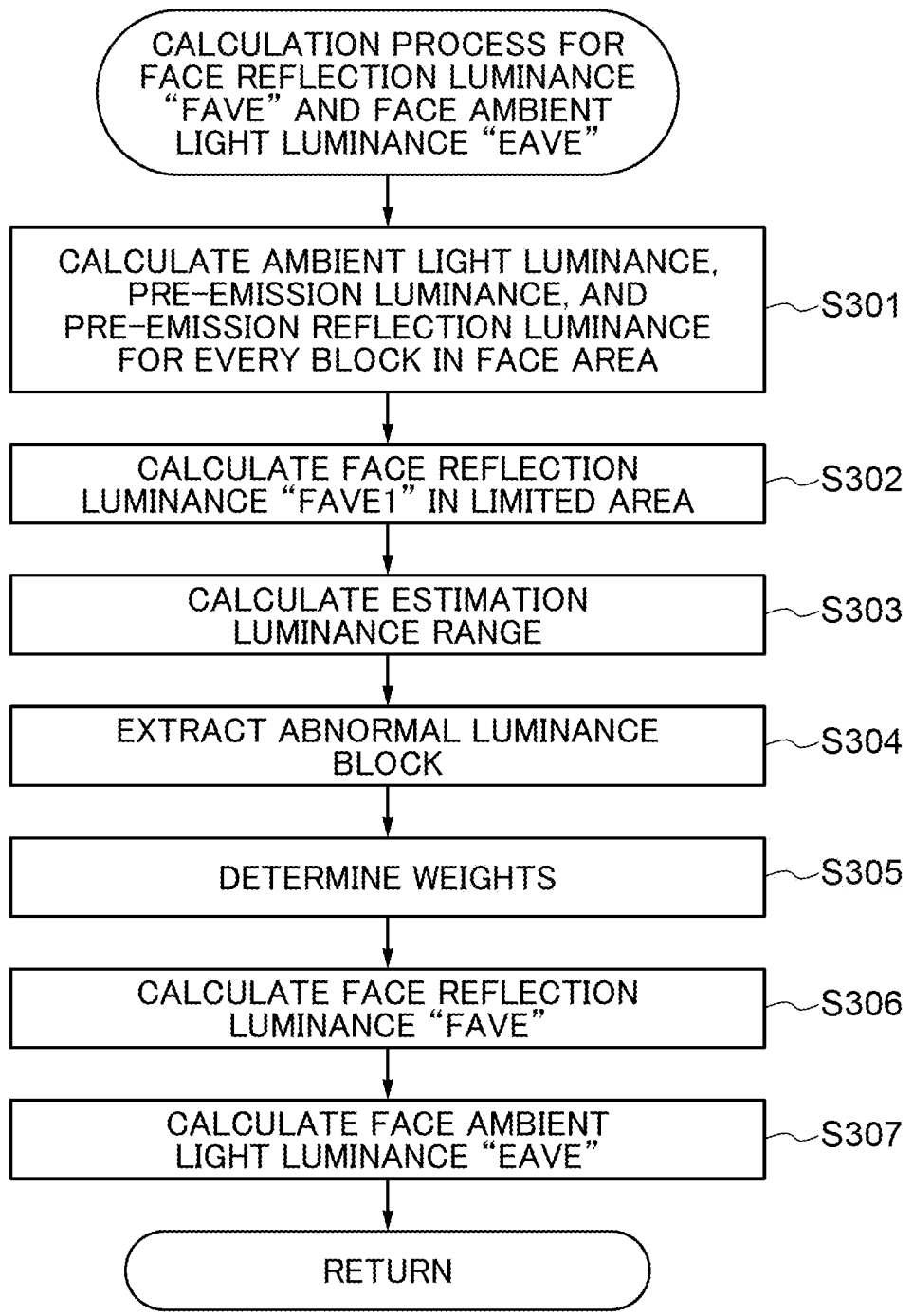

FIG. 5A
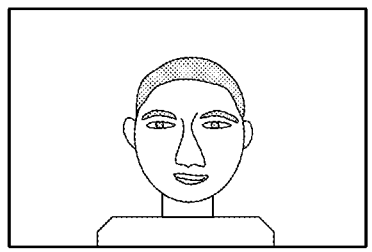
FIG. 5B
FIG. 5C
FIG. 5D
| 5 | 5 | 5 | 5 |
|---|---|---|---|
| 5 | 5 | 5 | 5 |
| 5 | 5 | 5 | 5 |
| 5 | 5 | 5 | 5 |
FIG. 5E
| 20 | 25 | 25 | 20 |
|---|---|---|---|
| 20 | 20 | 20 | 20 |
| 25 | 25 | 25 | 25 |
| 20 | 20 | 20 | 20 |
FIG. 5F
| 15 | 20 | 20 | 15 |
|---|---|---|---|
| 15 | 15 | 15 | 15 |
| 20 | 20 | 20 | 20 |
| 15 | 15 | 15 | 15 |
FIG. 5G
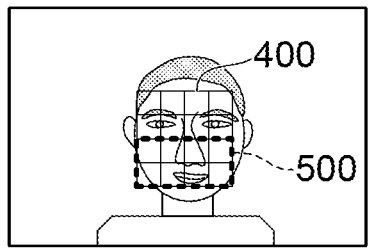
FIG. 5H
| 1.0 | 1.0 | 1.0 | 1.0 |
|---|---|---|---|
| 1.0 | 1.0 | 1.0 | 1.0 |
| 1.0 | 1.0 | 1.0 | 1.0 |
| 1.0 | 1.0 | 1.0 | 1.0 |
FIG. 5I
| 1.0 | 1.0 | 1.0 | 1.0 |
|---|---|---|---|
| 1.0 | 1.0 | 1.0 | 1.0 |
| 1.0 | 1.0 | 1.0 | 1.0 |
| 1.0 | 1.0 | 1.0 | 1.0 |
FIG. 5J
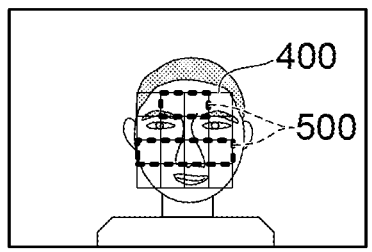
FIG. 5K
| 1.0 | 1.0 | 1.0 | 1.0 |
|---|---|---|---|
| 1.0 | 1.0 | 1.0 | 1.0 |
| 1.0 | 1.0 | 1.0 | 1.0 |
| 1.0 | 1.0 | 1.0 | 1.0 |
FIG. 5L
| 1.0 | 1.0 | 1.0 | 1.0 |
|---|---|---|---|
| 1.0 | 1.0 | 1.0 | 1.0 |
| 1.0 | 1.0 | 1.0 | 1.0 |
| 1.0 | 1.0 | 1.0 | 1.0 |

FIG. 6A
FIG. 6B
FIG. 6C
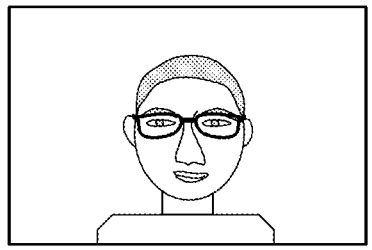
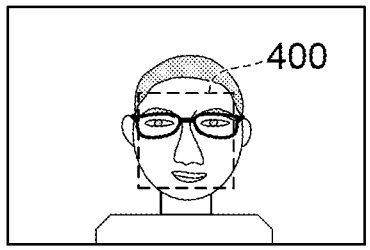
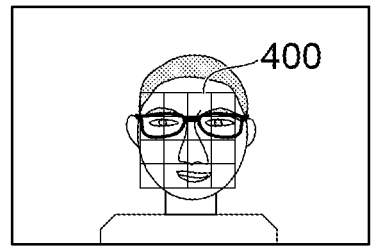
FIG. 6D
| 5 | 5 | 5 | 5 |
|---|---|---|---|
| 4 | 4 | 4 | 4 |
| 5 | 5 | 5 | 5 |
| 5 | 5 | 5 | 5 |
FIG. 6E
| 20 | 25 | 25 | 20 |
|---|---|---|---|
| 404 | 19 | 404 | 19 |
| 25 | 25 | 25 | 25 |
| 20 | 20 | 20 | 20 |
FIG. 6F
| 15 | 20 | 20 | 15 |
|---|---|---|---|
| 400 | 15 | 400 | 15 |
| 20 | 20 | 20 | 20 |
| 15 | 15 | 15 | 15 |
FIG. 6G
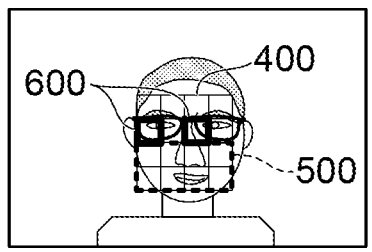
FIG. 6H
| 1.0 | 1.0 | 1.0 | 1.0 |
|---|---|---|---|
| 0.0 | 1.0 | 0.0 | 1.0 |
| 1.0 | 1.0 | 1.0 | 1.0 |
| 1.0 | 1.0 | 1.0 | 1.0 |
FIG. 6I
| 1.0 | 1.0 | 1.0 | 1.0 |
|---|---|---|---|
| 0.5 | 1.0 | 0.5 | 1.0 |
| 1.0 | 1.0 | 1.0 | 1.0 |
| 1.0 | 1.0 | 1.0 | 1.0 |
FIG. 6J
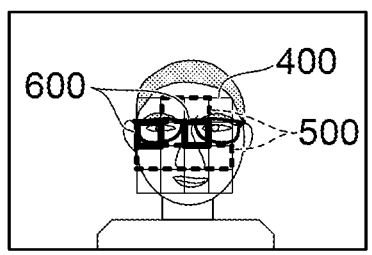
FIG. 6K
| 1.0 | 1.0 | 1.0 | 1.0 |
|---|---|---|---|
| 0.0 | 1.0 | 0.0 | 1.0 |
| 1.0 | 1.0 | 1.0 | 1.0 |
| 1.0 | 1.0 | 1.0 | 1.0 |
FIG. 6L
| 1.0 | 1.0 | 1.0 | 1.0 |
|---|---|---|---|
| 0.5 | 1.0 | 0.5 | 1.0 |
| 1.0 | 1.0 | 1.0 | 1.0 |
| 1.0 | 1.0 | 1.0 | 1.0 |

FIG. 7A
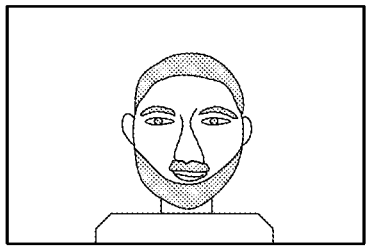
FIG. 7B
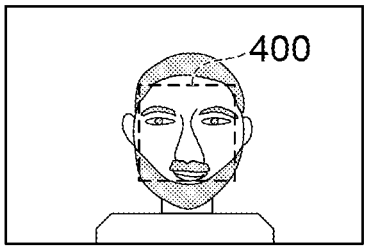
FIG. 7C
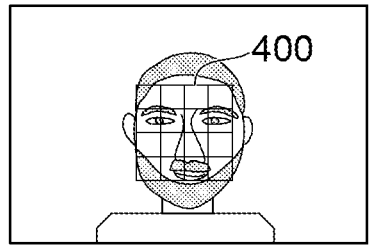
FIG. 7D
| 5 | 5 | 5 | 5 |
|---|---|---|---|
| 5 | 5 | 5 | 5 |
| 5 | 5 | 5 | 5 |
| 1 | 1 | 1 | 1 |
FIG. 7E
| 20 | 25 | 25 | 20 |
|----|----|----|----|
| 20 | 20 | 20 | 20 |
| 25 | 25 | 25 | 25 |
| 7  | 7  | 7  | 7  |
FIG. 7F
| 15 | 20 | 20 | 15 |
|----|----|----|----|
| 15 | 15 | 15 | 15 |
| 20 | 20 | 20 | 20 |
| 6  | 6  | 6  | 6  |
FIG. 7G
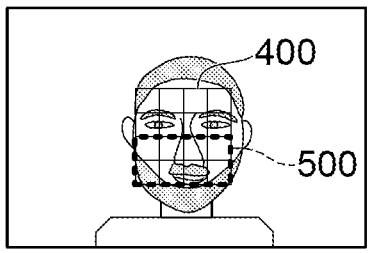
FIG. 7H
| 1.0 | 1.0 | 1.0 | 1.0 |
|-----|-----|-----|-----|
| 1.0 | 1.0 | 1.0 | 1.0 |
| 1.0 | 1.0 | 1.0 | 1.0 |
| 1.0 | 1.0 | 1.0 | 1.0 |
FIG. 7I
| 1.0 | 1.0 | 1.0 | 1.0 |
|-----|-----|-----|-----|
| 1.0 | 1.0 | 1.0 | 1.0 |
| 1.0 | 1.0 | 1.0 | 1.0 |
| 1.0 | 1.0 | 1.0 | 1.0 |
FIG. 7J
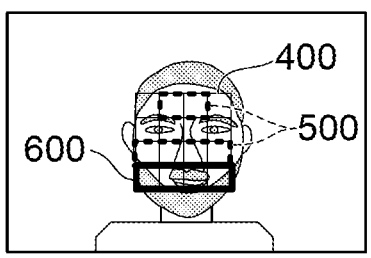
FIG. 7K
| 1.0 | 1.0 | 1.0 | 1.0 |
|-----|-----|-----|-----|
| 1.0 | 1.0 | 1.0 | 1.0 |
| 1.0 | 1.0 | 1.0 | 1.0 |
| 0.0 | 0.0 | 0.0 | 0.0 |
FIG. 7L
| 1.0 | 1.0 | 1.0 | 1.0 |
|-----|-----|-----|-----|
| 1.0 | 1.0 | 1.0 | 1.0 |
| 1.0 | 1.0 | 1.0 | 1.0 |
| 0.5 | 0.5 | 0.5 | 0.5 |

FIG. 9A   FIG. 9B   FIG. 9C
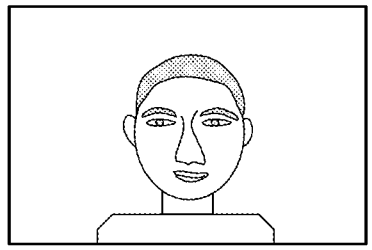  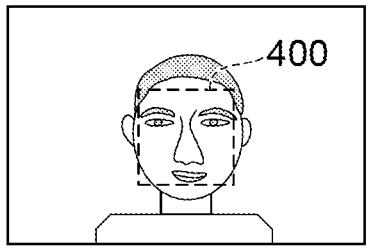  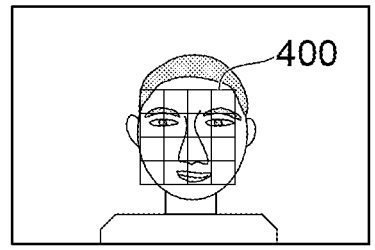
FIG. 9D    FIG. 9E    FIG. 9F
| 5 | 5 | 5 | 5 |
|---|---|---|---|
| 5 | 5 | 5 | 5 |
| 5 | 5 | 5 | 5 |
| 5 | 5 | 5 | 5 |
| 20 | 25 | 25 | 20 |
|----|----|----|----|
| 20 | 20 | 20 | 20 |
| 25 | 25 | 25 | 25 |
| 20 | 20 | 20 | 20 |
| 15 | 20 | 20 | 15 |
|----|----|----|----|
| 15 | 15 | 15 | 15 |
| 20 | 20 | 20 | 20 |
| 15 | 15 | 15 | 15 |
FIG. 9G    FIG. 9H    FIG. 9I
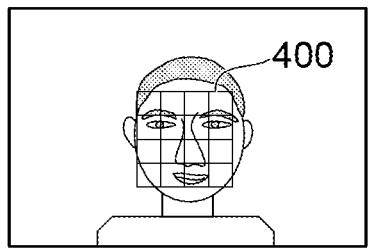
| 1.0 | 1.0 | 1.0 | 1.0 |
|-----|-----|-----|-----|
| 1.0 | 1.0 | 1.0 | 1.0 |
| 1.0 | 1.0 | 1.0 | 1.0 |
| 1.0 | 1.0 | 1.0 | 1.0 |
| 1.0 | 1.0 | 1.0 | 1.0 |
|-----|-----|-----|-----|
| 1.0 | 1.0 | 1.0 | 1.0 |
| 1.0 | 1.0 | 1.0 | 1.0 |
| 1.0 | 1.0 | 1.0 | 1.0 |

FIG. 10A
FIG. 10B
FIG. 10C
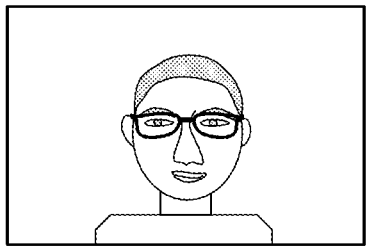
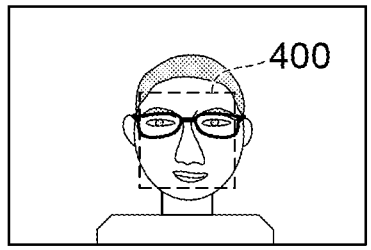
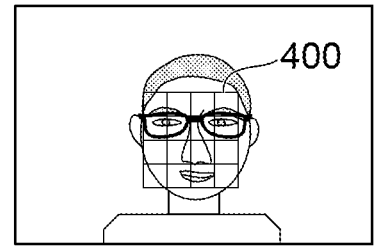
FIG. 10D
| 5 | 5 | 5 | 5 |
|---|---|---|---|
| 4 | 4 | 4 | 4 |
| 5 | 5 | 5 | 5 |
| 5 | 5 | 5 | 5 |
FIG. 10E
| 20 | 25 | 25 | 20 |
|----|----|----|----|
| 404 | 19 | 404 | 19 |
| 25 | 25 | 25 | 25 |
| 20 | 20 | 20 | 20 |
FIG. 10F
| 15 | 20 | 20 | 15 |
|----|----|----|----|
| 400 | 15 | 400 | 15 |
| 20 | 20 | 20 | 20 |
| 15 | 15 | 15 | 15 |
FIG. 10G
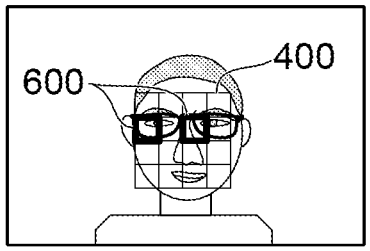
FIG. 10H
| 1.0 | 1.0 | 1.0 | 1.0 |
|-----|-----|-----|-----|
| 0.0 | 1.0 | 0.0 | 1.0 |
| 1.0 | 1.0 | 1.0 | 1.0 |
| 1.0 | 1.0 | 1.0 | 1.0 |
FIG. 10I
| 1.0 | 1.0 | 1.0 | 1.0 |
|-----|-----|-----|-----|
| 0.5 | 1.0 | 0.5 | 1.0 |
| 1.0 | 1.0 | 1.0 | 1.0 |
| 1.0 | 1.0 | 1.0 | 1.0 |

FIG. 11A
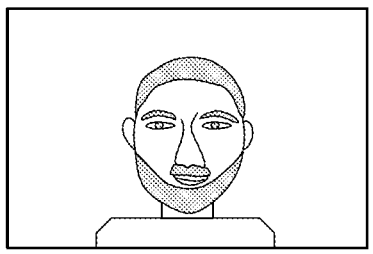
FIG. 11B
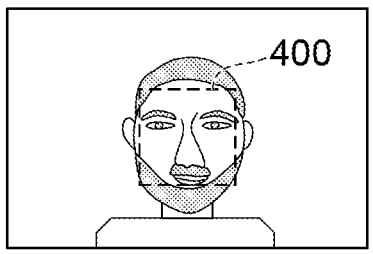
FIG. 11C
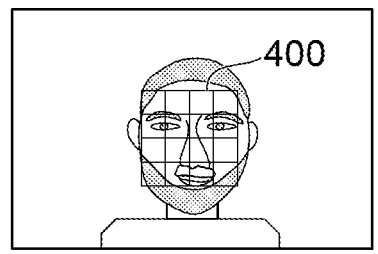
FIG. 11D
| 5 | 5 | 5 | 5 |
|---|---|---|---|
| 5 | 5 | 5 | 5 |
| 5 | 5 | 5 | 5 |
| 1 | 1 | 1 | 1 |
FIG. 11E
| 20 | 25 | 25 | 20 |
|---|---|---|---|
| 20 | 20 | 20 | 20 |
| 25 | 25 | 25 | 25 |
| 7 | 7 | 7 | 7 |
FIG. 11F
| 15 | 20 | 20 | 15 |
|---|---|---|---|
| 15 | 15 | 15 | 15 |
| 20 | 20 | 20 | 20 |
| 6 | 6 | 6 | 6 |
FIG. 11G
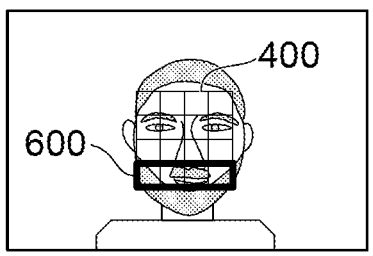
FIG. 11H
| 1.0 | 1.0 | 1.0 | 1.0 |
|---|---|---|---|
| 1.0 | 1.0 | 1.0 | 1.0 |
| 1.0 | 1.0 | 1.0 | 1.0 |
| 0.0 | 0.0 | 0.0 | 0.0 |
FIG. 11I
| 1.0 | 1.0 | 1.0 | 1.0 |
|---|---|---|---|
| 1.0 | 1.0 | 1.0 | 1.0 |
| 1.0 | 1.0 | 1.0 | 1.0 |
| 0.5 | 0.5 | 0.5 | 0.5 |

FIG. 12A
FIG. 12B
FIG. 12C
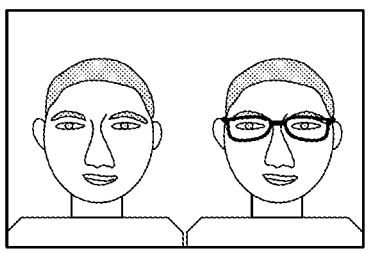
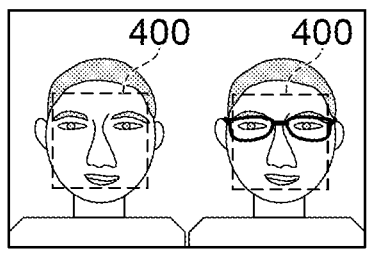
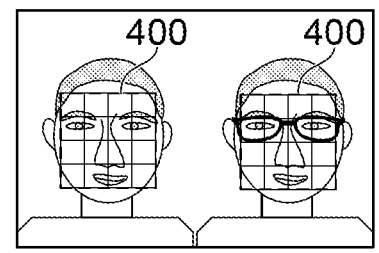
FIG. 12D
| 1.0 | 1.0 | 1.0 | 1.0 |
|---|---|---|---|
| 1.0 | 1.0 | 1.0 | 1.0 |
| 1.0 | 1.0 | 1.0 | 1.0 |
| 1.0 | 1.0 | 1.0 | 1.0 |
| 0.0 | 0.0 | 0.0 | 0.0 |
|---|---|---|---|
| 0.0 | 0.0 | 0.0 | 0.0 |
| 0.0 | 0.0 | 0.0 | 0.0 |
| 0.0 | 0.0 | 0.0 | 0.0 |

IMAGE PICKUP APPARATUS THAT CONTROLS FLASH EMISSION AMOUNT AT PHOTOGRAPHING AND CONTROL METHOD THEREFOR

BACKGROUND OF THE INVENTION

Field of the Invention

The present invention relates to an image pickup apparatus and its control method, and in particular, relates to control of a flash emission amount at photographing.

Description of the Related Art

In flash photography by an image pickup apparatus, a technique that controls a flash to per tint pre-emission prior to main emission for main exposure (main photographing) to control emission intensity and emission time of the main emission on the basis of a photometry value of reflected light from an object obtained at the pre-emission is used. At that time, there is a known technique that detects a face area and calculates a main emission amount on the basis of a reflection luminance average in the face area obtained by performing the pre-emission. For example, Japanese Laid-Open Patent Publication (Kokai) No. 2009-100252 (JP 2009-100252A) suggests a technique that reduces fluctuation of the reflection luminance average under influence of abnormal reflection light resulting from glasses in a face detection area, etc. Specifically, the technique detects specific luminance distribution in the face detection area and excepts the specific luminance distribution when calculating the reflection luminance average.

However, the technique described in the above-mentioned publication has a problem that a calculation amount will become huge as the number of divisions of the face area increases, i.e., as a divided area that is obtained by dividing the face area becomes narrower.

SUMMARY OF THE INVENTION

The present invention provides an image pickup apparatus that is capable of reducing influence of abnormal reflection light at a time of pre-emission upon determination of an emission amount for main photographing and is capable of enabling suitable flash photography with a small calculation amount.

Accordingly, a first aspect of the present invention provides an image pickup apparatus that enables photographing using a lighting device, including a memory device that stores a set of instructions, and at least one processor that executes the set of instructions to calculate reflection luminances of reflected light from an object at pre-emission of the lighting device, calculate ambient light luminances of the object under ambient light, detect a face area from one of an image obtained under the ambient light and an image obtained at the pre-emission of the lighting device, divide the face area into blocks, calculate a face reflection luminance from a weighted average of the reflection luminances of the blocks and first weights of the blocks, calculate a face ambient light luminance from a weighted average of the ambient light luminances of the blocks and second weights of the blocks, and determine an emission amount of the lighting device for main photographing with using the face reflection luminance and the face ambient light luminance. The first weight of an abnormal luminance block of which a reflection luminance does not fall within a predetermined luminance range among the blocks is reduced than the first weight of a block other than the abnormal luminance block in the calculation of the face reflection luminance.

Accordingly, a second aspect of the present invention provides an image pickup apparatus that enables photographing using a lighting device, including a memory device that stores a set of instructions and at least one processor that executes the set of instructions to calculate reflection luminances of reflected light from an object at pre-emission of the lighting device, calculate ambient light luminances of the object under ambient light, detect a face area from one of an image obtained under the ambient light and an image obtained at the pre-emission of the lighting device, calculate a face ambient light luminance in the face area from the ambient light luminances, calculate a face reflection luminance in the face area from the reflection luminances, set an estimation luminance range in which the reflection luminances in the face area are estimated to be distributed in accordance with the reflection luminances, and determine an emission amount of the lighting device for main photographing with using the face reflection luminance and the face ambient light luminance. A contribution rate for calculating the face reflection luminance in a face area that is outside the estimation luminance range is reduced than that in a face area that is in the estimation luminance range in a case where a plurality of face areas are detected.

Accordingly, a third aspect of the present invention provides an image pickup apparatus that enables photographing using a lighting device, including a memory device that stores a set of instructions, and at least one processor that executes the set of instructions to calculate reflection luminances of reflected light from an object at pre-emission of the lighting device, calculate ambient light luminances of the object under ambient light, detect a face area from one of an image obtained under the ambient light and an image obtained at the pre-emission of the lighting device, calculate a face ambient light luminance in the face area from the ambient light luminances, calculate a face reflection luminance in the face area from the reflection luminances, set an estimation luminance range in which the reflection luminances in the face area are estimated to be distributed in accordance with the reflection luminances, and determine an emission amount of the lighting device for main photographing with using the face reflection luminance and the face ambient light luminance. The face reflection luminance is calculated using the reflection luminances in the face area of a main face that is focused in a case where a plurality of the face areas are detected and the reflection luminances in the face area of the main face fall within the estimation luminance range. The face reflection luminance is calculated using the reflection luminances in a face area of a sub face other than the main face in a case where a plurality of the face areas are detected and the reflection luminances in the face area of the main face do not fall within the estimation luminance range.

Accordingly, a fourth aspect of the present invention provides an image pickup apparatus that enables photographing using a lighting device, including a memory device that stores a set of instructions, and at least one processor that executes the set of instructions to detect a face area from one of an image obtained under the ambient light and an image obtained at the pre-emission of the lighting device, calculate an average luminance in the face area from the image obtained at the pre-emission of the lighting device, calculate ambient light luminances of an object under ambient light, calculate a threshold for determining an abnormal luminance from the average luminance, determine the abnormal luminance using the threshold, replace a Bayer array that is determined to have the abnormal luminance with a Bayer array determined not to have the abnormal luminance, calculate a face reflection luminance from reflection luminances in the face area after replacement, calculate a face ambient light luminance in the face area from the ambient light luminances, and determine an emission amount of the lighting device for main photographing with using the face reflection luminance and the face ambient light luminance.

Accordingly, a fifth aspect of the present invention provides a control method for an image pickup apparatus, the control method including calculating reflection luminances of reflected light from an object at pre-emission of a lighting device, calculating ambient light luminances of the object under ambient light, detecting a face area from one of an image obtained under the ambient light and an image obtained at the pre-emission of the lighting device, dividing the face area into blocks, calculating a face reflection luminance from a weighted average of the reflection luminances of the blocks and first weights of the blocks, calculating a face ambient light luminance from a weighted average of the ambient light luminances of the blocks and second weights of the blocks; and determining an emission amount of the lighting device for main photographing with using the face reflection luminance and the face ambient light luminance. The first weight of an abnormal luminance block of which a reflection luminance does not fall within a predetermined luminance range among the blocks is reduced than the first weight of a block other than the abnormal luminance block in the calculation of the face reflection luminance.

Accordingly, a sixth aspect of the present invention provides a control method for an image pickup apparatus the control method including calculating reflection luminances of reflected light from an object at pre-emission of a lighting device, calculating ambient light luminances of the object under ambient light, detecting a face area from one of an image obtained under the ambient light and an image obtained at the pre-emission of the lighting device, calculating a face ambient light luminance in the face area from the ambient light luminances, calculating a face reflection luminance in the face area from the reflection luminances, setting an estimation luminance range in which the reflection luminances in the face area are estimated to be distributed in accordance with the reflection luminances, and determining an emission amount of the lighting device for main photographing with using the face reflection luminance and the face ambient light luminance. A contribution rate for calculating the face reflection luminance of a face area that is outside the estimation luminance range is reduced than that of a face area that is in the estimation luminance range in a case where a plurality of face areas are detected.

Accordingly, a seventh aspect of the present invention provides a control method for an image pickup apparatus, the control method including calculating reflection luminances of reflected light from an object at pre-emission of a lighting device, calculating ambient light luminances of the object under ambient light, detecting a face area from one of an image obtained under the ambient light and an image obtained at the pre-emission of the lighting device, calculating a face ambient light luminance in the face area from the ambient light luminances, calculating a face reflection luminance in the face area from the reflection luminances, setting an estimation luminance range in which the reflection luminances in the face area are estimated to be distributed in accordance with the reflection luminances, and determining an emission amount of the lighting device for main photographing with using the face reflection luminance and the face ambient light luminance. The face reflection luminance is calculated using the reflection luminances of the face area of a main face that is focused in a case where a plurality of the face areas are detected and the reflection luminances of the face area of the main face fall within the estimation luminance range. The face reflection luminance is calculated using the reflection luminances of a face area of a sub face other than the main face in a case where a plurality of the face areas are detected and the reflection luminances of the face area of the main face do not fall within the estimation luminance range.

Accordingly, an eighth aspect of the present invention provides a control method for an image pickup apparatus, the control method including detecting a face area from one of an image obtained under the ambient light and an image obtained at the pre-emission of the lighting device, calculating an average luminance in the face area from the image obtained at the pre-emission of the lighting device, calculating ambient light luminances of the object under ambient light, calculating a threshold for determining an abnormal luminance from the average luminance, determining the abnormal luminance using the threshold, replacing a Bayer array that is determined to have the abnormal luminance with a Bayer array determined not to have the abnormal luminance, calculating a face reflection luminance from reflection luminances in the face area after replacement, calculating a face ambient light luminance in the face area from the ambient light luminances, and determining an emission amount of the lighting device for main photographing with using the face reflection luminance and the face ambient light luminance.

According to the present invention, the influence of abnormal reflection light at a time of pre-emission upon determination of an emission amount for main photographing is reduced and suitable flash photography is available with a small calculation amount.

Further features of the present invention will become apparent from the following description of exemplary embodiments with reference to the attached drawings.

BRIEF DESCRIPTION OF THE DRAWINGS

FIG. 4 is a flowchart describing a first calculation method of the process in S205.

FIG. 5A through FIG. 5L are views describing the first calculation method applied to a first photographing scene.

FIG. 6A through FIG. 6L are views describing the first calculation method applied to a second photographing scene.

FIG. 7A through FIG. 7L are views describing the first calculation method applied to a third photographing scene.

FIG. 9A through FIG. 9I are views describing the second calculation method applied to the first photographing scene.

FIG. 10A through FIG. 10I are vie describing the second calculation method applied to the second photographing scene.

FIG. 11A through FIG. 11I are views describing the second calculation method applied to the third photographing scene.

FIG. 12A through FIG. 12D are views describing the first and second calculation methods applied to a scene in which a plurality of faces are detected in a photographing area.

DESCRIPTION OF THE EMBODIMENTS

Figure 1:
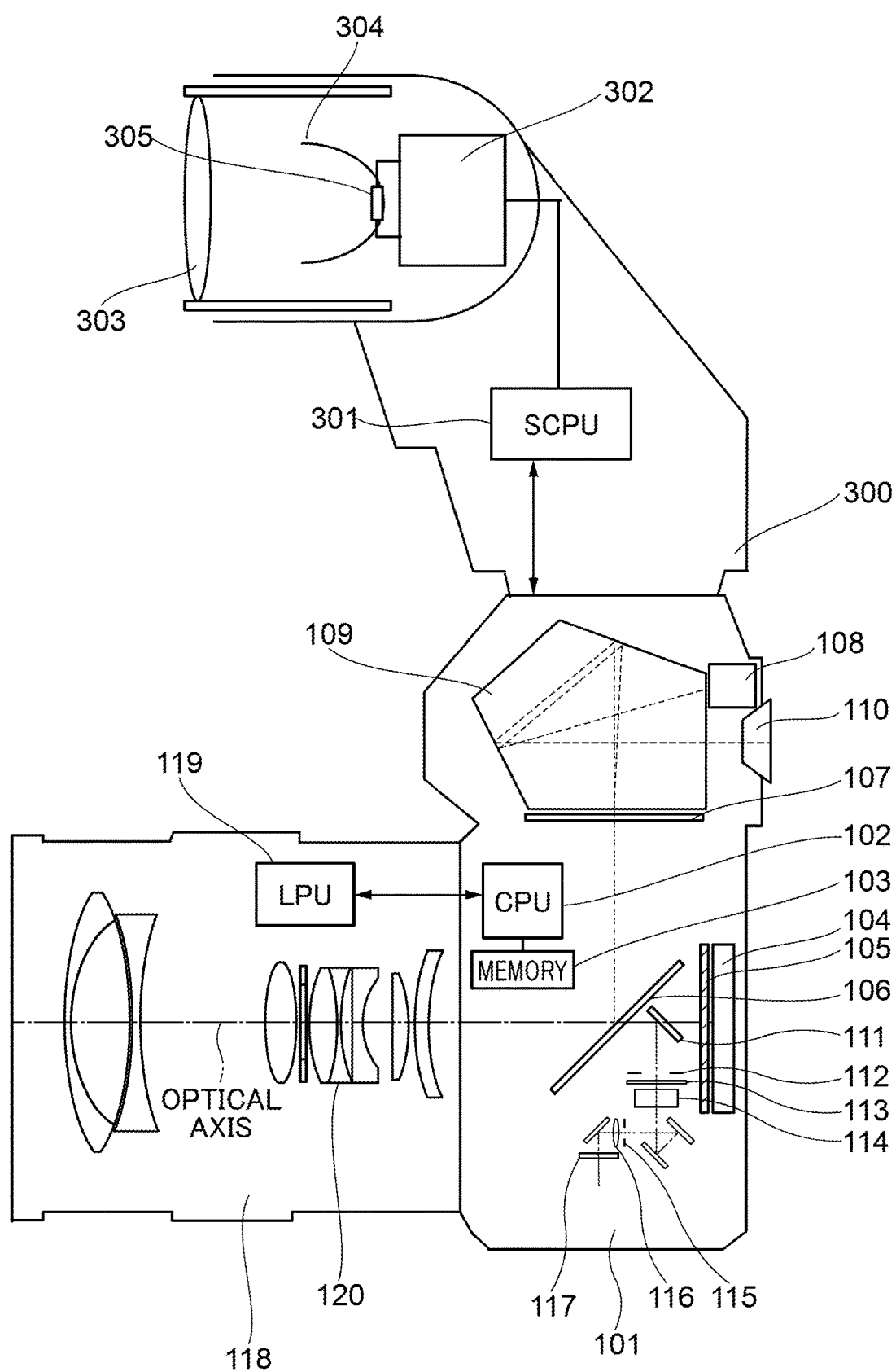
FIG. 1 is a view describing a schematic configuration of an image pickup apparatus according to an embodiment of the present invention.

Hereafter, embodiments according to the present invention will be described in detail by referring to the drawings.

FIG. 1 is a view describing a schematic configuration of an image pickup apparatus 100 according to an embodiment of the present invention. The image pickup apparatus 100 is provided with an image pickup apparatus body 101 (hereinafter referred to as "a camera body 101"), a lens barrel 118, and a lighting device 300 (hereinafter referred to as "a flash 300").

The camera body 101 is provided with a CPU 102, a memory 103, an image pickup unit 104, a shutter 105, a half mirror 106 (main mirror), a sub mirror 111, a focusing screen 107, a photometry sensor 108, a pentagonal prism 109, and an optical finder 110. Moreover, the camera body 101 is provided with a visual field mask 112, an infrared cut filter 113, a field lens 114, a diaphragm 115, a secondary image forming lens 116, and a focus detection sensor 117.

The CPU 102 totally controls the image pickup apparatus 100 by performing various kinds of controls of the camera body 101. The memory 103 is a storage means, such as a RAM or a ROM, that is connected to the CPU 102 and stores programs that are executed by the CPU 102 and data. The image pickup unit 104 has an image sensor, such as a CCD sensor or a CMOS sensor, that includes an infrared cut filter, a low pass filter, etc. Light that passes the lens barrel 118 and enters into the camera body 101 forms an object image (optical image) on the image pickup unit 104. The shutter 105 closes to shade the image pickup unit 104 when non-photographing and opens to allow passage of light to the image pickup unit 104 when photographing.

The half mirror 106 reflects a part of light that enters through the lens barrel 118 to form an image on the focusing screen 107 when non-photographing. The photometry sensor 108 is provided with an image sensor, such as a CCD sensor or a CMOS sensor. The CPU 102 performs an object recognition process by performing a photometry calculation, a face detection calculation, a tracking calculation, and a flash-exposure control calculation, etc., on the basis of an image signal output from the photometry sensor 108. The pentagonal prism 109 guides the light that is reflected by the half mirror 106 and passes through the focusing screen 107 to the photometry sensor 108 and the optical finder 110. The light that transmits the half mirror 106 is bent below by the sub mirror 111 and forms an image on the focus detection sensor 117 through the visual field mask 112, the infrared cut filter 113, the field lens 114, the diaphragm 115, and the secondary image forming lens 116. The CPU 102 detects a focus state of an image pickup optical system in the lens barrel 118 on the basis of the image signal obtained by photoelectric conversion in the focus detecting sensor 117.

The lens barrel 118 is provided with an LPU 119 and lens groups 120. The LPU 119 controls movement of at least one lens group of the lens groups 120. For example, when receiving a defocus amount (a deviation amount of focus) from the CPU 102, the LPU 119 moves a focusing lens group of the lens groups 120 to an in-focus position (a position where an object is in focus) in an optical axis direction on the basis of the received defocus amount.

The flash 300 is provided with an SCPU 301, a light amount controller 302, a panel 303, a reflection umbrella 304, and a light source 305. The SCPU 301 is a CPU in the flash 300 and controls operations of sections of the flash 300 according to an operation from a user or an instruction from the CPU 102. The light amount controller 302 includes a booster circuit that boosts battery voltage to light the light source 305, and a current control circuit that controls start and stop of emission. The panel 303 consists of a Fresnel lens etc. and is constituted as a zoom optical system that changes an irradiation angle of light (illumination). The reflection umbrella 304 condenses a luminescent light flux of the light source to irradiate an object. The light source 305 is a xenon tube or a white LED etc.

Figure 2:
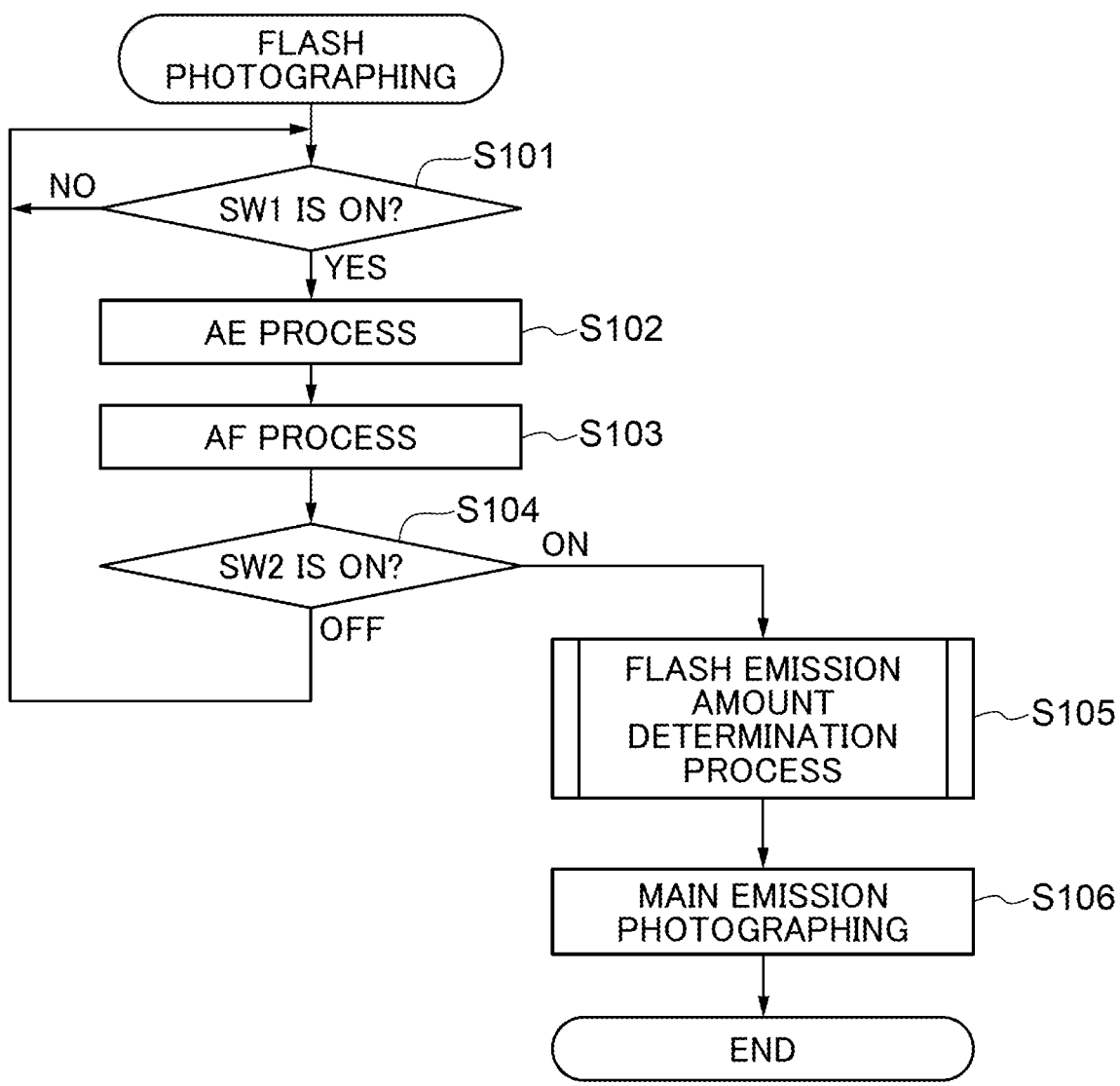
FIG. 2 is a flowchart describing the entire flow of flash photography by the image pickup apparatus.

FIG. 2 is a flowchart describing the entire flow of flash photography by the image pickup apparatus 100. Each process (step) shown by an S number in FIG. 2 is achieved when the CPU 102 runs a program stored in the memory 103 to control operations of the image pickup apparatus 100 totally.

The start of the process in S101 is premised on the start of the image pickup apparatus 100. The CPU 102 determines whether a release button (not shown) which instructs photographing, is half-pressed in S101 by determining whether a status of a first switch SW1 that is provided to the release button is changed from OFF to ON. When determining that the SW1 is ON (YES in S101), the CPU 102 proceeds with the process to S102. When determining that the SW1 keeps OFF (NO in S101) the CPU 102 returns the process to S101 to repeat the determination process in S101.

The CPU 102 performs an AE process in S102 by controlling the photometry sensor 108. Thereby, a photometry value including luminance information of an object under ambient light is obtained. Moreover, the CPU 102 determines an exposure control value defined by an aperture value, an ISO speed, etc. for main photographing on the basis of the photometry value under the ambient light in S102.

The CPU 102 performs an auto-focusing (AF) process of a phase difference system on the basis of an image signal from the focus detection sensor 117 in S103. The CPU 102 transmits a defocus amount found by the AF process to the LPU 119. Then, the LPU 119 moves the focusing lens group in the lens groups 120 to an in-focus position on the basis of the defocus amount received from the CPU 102.

The CPU 102 determines whether the release button (not shown) is full-pressed in S104 by determining whether a status of a second switch SW2 that is provided to the release button is changed from OFF to ON. When determining that the SW2 turns ON (YES in S104), the CPU 102 proceeds with the process to S105. When determining that the SW2 is OFF (NO in S104), the CPU 102 returns the process to S101 to repeat the determination process in S101.

In S105, the CPU 102 drives the photometry sensor 108 and the flash 300 to determine a flash emission amount. In S105, the main emission amount for main photographing is determined using a photometry result that is obtained without performing the pre-emission and a photometry result that is obtained with performing the pre-emission. Details of the process will be described below. In S106, the CPU 102 executes a main emission photography (flash photography) on the basis of the exposure control value calculated in S102 and the main emission amount calculated in S105. Accordingly, this process is finished.

Figure 3:
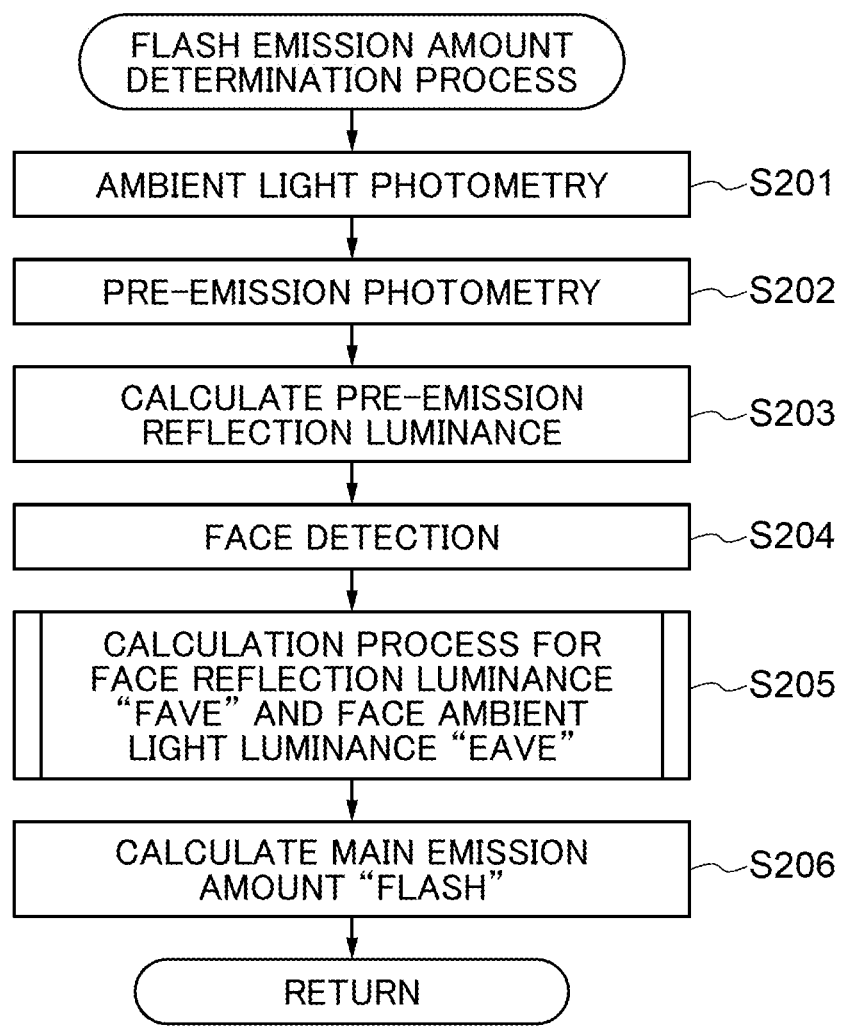
FIG. 3 is a flowchart showing a flash emission amount determination process in S105.

FIG. 3 is a flowchart describing details of the flash emission amount determination process in S105. In S201, the CPU 102 drives the photometry sensor 108, obtains an ambient light luminance in each of blocks that divide a detection area of the photometry sensor 108 without performing the pre-emission, and saves the image data in the memory 103. In S202, the CPU 102 drives the flash 300 and the photometry sensor 108 to perform photometry and the pre-emission, obtains a luminance when performing the pre-emission (hereinafter referred to as a "pre-emission luminance") in each of the blocks, and saves the image data in the memory 103. In S203, the CPU 102 calculates a luminance (hereinafter referred to as a "pre-emission reflection luminance") by subtracting the ambient light luminance from the pre-emission luminance in each of the blocks. The pre-emission reflection luminance can be regarded as the reflection luminance of only the flash light except the influence of ambient light.

In S204, the CPU 102 performs a face detection process using the image data saved in the memory 103 and detects a face area in a photographing area. It should be noted that the face detection process is performed using all the image data obtained in S102, S201, and S202, or is performed using a part of the image data.

In S205, the CPU 102 calculates a face reflection luminance FAVE (an average of the pre-emission reflection luminances in blocks included in the face area) using the pre-emission reflection luminances calculated in S203 and the face area detected in S204. In S205, the CPU 102 further calculates a face ambient light luminance EAVE (an average of the ambient light luminances of the blocks included in the face area) using the face area detected in S204 and the ambient light luminances generated in S201. The details of the methods of calculating the face reflection luminance FAVE and the face ambient light luminance EAVE are mentioned later.

In S206, the CPU 102 calculates the main emission amount FLASH. Specifically, the CPU 102 calculates a difference DF between the face reflection luminance FAVE calculated in S205 and a suitable luminance value Yt with the following relational expression.

$$DF=FAVE/Yt$$

The suitable luminance value Yt is a value that achieves correct exposure at the main photographing. Moreover, in S206, the CPU 102 determines a flash light reduction amount DOWN with the following relational expression according to the exposure control value calculated in S102 and the face ambient light luminance HAVE calculated in S205.

$$DOWN=MAX\ \{EAVE/(exposure\ control\ value),\ 1\}$$

This is because of reducing the Hash light amount so that an object will not become too bright by the emission of the flash 300 in a scene where the object is bright under the ambient light. Then, the CPU 102 determines the main emission amount FLASH with the following relational expression from the difference DF, the flash light reduction amount DOWN, and the emission amount of the pre-emission.

$$FLASH=(emission\ amount\ of\ pre\text{-}emission)/(DF\cdot DOWN)$$

The CPU 102 transmits the determined main emission amount FLASH to the SCPU 301. After that, the process proceeds to S106.

Next, a first calculation method for calculating the face reflection luminance FAVE and the face ambient light luminance EAVE in S205 will be described. FIG. 4 is a flowchart describing the first calculation method of the process in S205. FIG. 5A through FIG. 7L are schematic views describing the first calculation method applied to respective photographing scenes. FIG. 5A, FIG. 6A, and FIG. 7A show examples of first, second, and third photographing scenes (photographing areas), respectively. In the following description, the first photographing scene in FIG. 5A is called a "scene A", the second photographing scene in FIG. 6A is called a "scene B", and the third photographing scene in FIG. 7A is called a "scene C".

FIG. 5B, FIG. 6B, and FIG. 7B show face areas 400 obtained by applying the face detection process in S204 to the photographing areas of the scenes A, B, and C, respectively. FIG. 5C, FIG. 6C, and FIG. 7C show stares where the face areas 400 in the scenes A. B, and C are divided into a plurality of blocks (specifically 4-4 blocks), respectively. FIG. 5D, FIG. 6D, and FIG. 7D schematically show distributions of the ambient light luminances of the blocks in the scenes A, B, and C, respectively. FIG. 5E, FIG. 6E, and FIG. 7E schematically show distribution of the pre-emission luminances of the blocks in the scenes A, B, and C, respectively. FIG. 5F, FIG. 6F, and FIG. 7F schematically show distributions of the pre-emission reflection luminances of the blocks in the scenes A, B, and C, respectively.

The face reflection luminances FAVE become FAVE_A=17 in the scene A (FIG. 5A), FAVE_B=65 in the scene B (FIG. 6F) due to influence of specular reflection by glasses, and FAVE_C=15 in the scene C (FIG. 7F) due to influence of a beard part. Accordingly, when the main emission amount FLASH is determined in S206 using the face reflection luminances FAVE, the correct exposure is achieved in the scene A, the exposure in the scene B becomes underexposure of −1.7 steps, and the exposure in the scene C becomes overexposure of +0.2 steps. In order to bring the exposures in the scenes B and C close to a suitable exposure value, the process of the flowchart in FIG. 4 is performed.

In S301, the CPU 102 divides the face area 400 into a plurality of blocks and calculates the ambient light luminance, pre-emission luminance, and pre-emission reflection luminance for every block. Thereby, the results in FIG. 5D through FIG. 5F, FIG. 6D through FIG. 6F, and FIG. 7D through FIG. 7F are obtained.

In S302, the CPU 102 sets an area (hereinafter referred to as a "limited area") 500 except blocks that show abnormal luminances in the face area 400 and calculates a face reflection luminance FAVE1 of the limited area 500 from the pre-emission reflection luminances of the blocks in the limited area 500. For example, as shown in FIG. 5G, FIG. 6G, and FIG. 7G, an area (4-column-2-line blocks in the lower area in the vertical direction) that does not include the specular reflection by the glasses is set as the limited area 500 of the face area 400 in each of the scenes A, B, and C. The face reflection luminances FAVE1 of the limited area 500 become FAVE1_A=18 in the scene A, FAVE1_B=18 in the scene B, and FAVE1_C=13 in the scene C.

In S303, the CPU 102 sets an estimation reflection luminance range (hereinafter referred to as an "estimation luminance range") in which the pre-emission reflection luminances in the face area are estimated to be distributed, with respect to the face reflection luminance FAVE1 of the limited area 500. The estimation luminance range can be determined on the basis of at least one of the emission amounts at the pre-emission, a sensitivity of the image pickup unit 104, an aperture, an exposure amount in an accumulation period, distance information to an object, a reflectance range of human skin, and a face size. For example, when exposure correction of ±1.5 steps is set as the estimation luminance range, it will become 6 through 50 in the scene A, 6 through 50 in the scene B, and 5 through 37 in the scene C.

In S304, the CPU 102 extracts an abnormal luminance block 600 of which pre-emission reflection luminance is outside the estimation luminance range. When blocks of which pre-emission reflection luminances are outside the estimation luminance range are extracted from the pre-emission reflection luminances in FIG. 5F, FIG. 6F, and FIG. 7F, two blocks corresponding to the glasses part of the person in the scene B are extracted as the abnormal luminance blocks 600 as shown in FIG. 6G.

In S305, the CPU 102 determines first weights of the respective blocks for calculating the face reflection luminance FAVE and second weights of the respective blocks for calculating the face ambient light luminance EAVE. FIG. 5H, FIG. 6H, and FIG. 7H show the exam les of the first weights for calculating the face reflection luminance FAVE in the scenes A, B, and C, respectively. The weights of the abnormal luminance blocks 600 are set to "0.0" in FIG. 6H, FIG. 5I, FIG. 6I, and FIG. 7I show the examples of the second weights for calculating the face ambient light luminance EAVE in the scenes A, B, and C, respectively. The weights of the abnormal luminance blocks 600 are set to "0.5" in FIG. 6I.

When the face ambient light luminance EAVE is calculated, the weights of the blocks corresponding to the glasses and the beard part are preferably made smaller than the weights of the other blocks. Accordingly, the weights for calculating the face ambient light luminance EAVE may be the same as the weights for calculating the face reflection luminance FAVE. However, the influence of the glasses and the beard part on the ambient light is smaller than that on the flash light by the pre-emission. Accordingly, the declines of the weights (FIG. 6I) for calculating the face ambient light luminance EAVE are made smaller than the declines of the weights (FIG. 6H) for calculating the face reflection luminance FAVE.

In the meantime, the weights (FIG. 5I, FIG. 6I, and FIG. 7I) for calculating the face ambient light luminance EAVE may not be reduced even in the abnormal luminance blocks 600. Moreover, the weights for calculating the face ambient light luminance EAVE and the weights for calculating the face reflection luminance FAVE may be gradually reduced in accordance with absolute values of the differences between the face reflection luminance FAVE1 of the limited area 500 and the reflection luminances of the respective blocks.

In S306, the CPU 102 calculates the face reflection luminance FAVE from a weighted average of the pre-emission reflection luminances of the respective blocks calculated in S301 and the weights for calculating the face reflection luminance FAVE of the respective blocks determined in S305. The face reflection luminances FAVE become FAVE_A=17 in the scene A, FAVE_B=17 in the scene B, and FAVE_C=15 in the scene C.

In S307, the CPU 102 calculates the face ambient light luminance EAVE from a weighted average of the ambient light luminances of the respective blocks calculated in S301 and the weights for calculating the face ambient light reflection luminance EAVE of the respective blocks determined in S305. Thereby, this process is finished and the process proceeds to S206.

The above-mentioned calculation brings the correct exposure in the scene A and avoids becoming underexposure in the scene B in which the specular reflection of the glasses is included.

In order to reduce the influence of the beard part in the scene C, it is preferable to set the limited area 500 to blocks near a forehead, blocks near cheeks, and blocks near a nose in S302 as shown in FIG. 5J, FIG. 6J, and FIG. 7J. The face reflection luminance FAVE1 of the limited area 500 in this case is equal to "20" in each of the scenes A, B, and C, and the estimation luminance range becomes 7 through 57. Accordingly, the blocks corresponding to the glasses part in the scene B in the pre-emission reflection luminances in FIG. 6F and the blocks corresponding to the beard part in the scene C in the pre-emission reflection luminances in FIG. 7F are extracted as the abnormal luminance blocks 600 as shown in FIG. 6J and FIG. 7J.

Furthermore, the weights for calculating the face reflection luminance FAVE of the respective blocks are reduced as shown in FIG. 6K and FIG. 7K. Moreover, the weights for calculating the face ambient light luminance EAVE of the respective blocks are reduced as shown in FIG. 6L and FIG. 7L. Since the weights in the scene A are not changed, FIG. 5K and FIG. 5L are identical to FIG. 5H and FIG. 5I, respectively. The face reflection luminances FAVE become FAVE_A–17 in the scene A, FAVE_B=17 in the scene B, and FAVE_C=18 in the scene C.

Thus, the exposure changes resulting from the specular reflection of the glasses in the scene B and the beard part in the scene C from the correct exposure of the scene A can be reduced.

Figure 8:
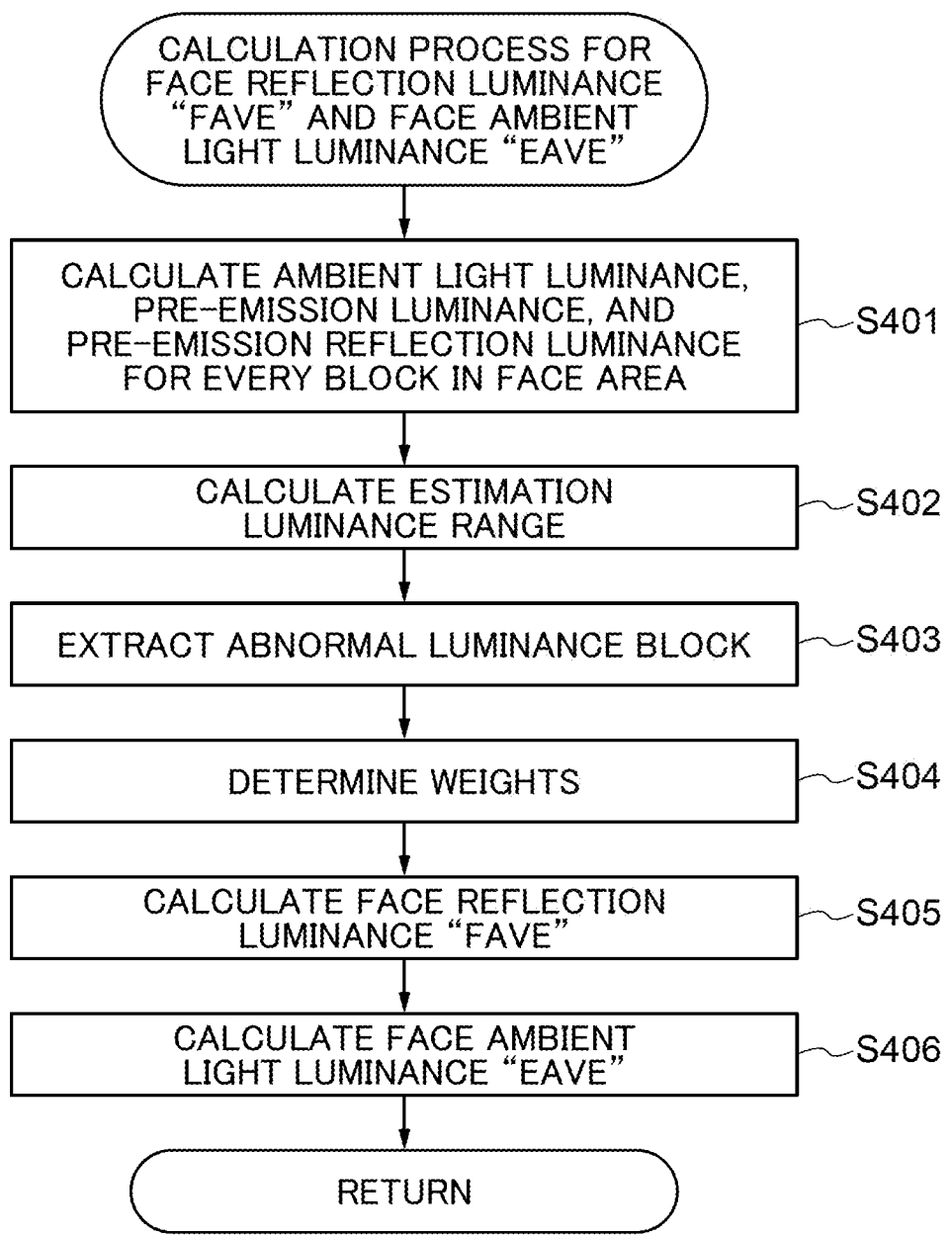
FIG. 8 is a flowchart describing a second calculation method of the process in S205.

Next, a second calculation method for calculating the face reflection luminance FAVE and the face ambient light luminance EAVE in S205 will be described. FIG. 8 is a flowchart describing the first calculation method of the second calculation method in S205. FIG. 9A through FIG. 11I are schematic views describing the second calculation method applied to respective photographing scenes. FIG. 9A through FIG. 9F are identical to FIG. 5A through FIG. 5F. FIG. 10A through FIG. 10F are identical to FIG. 6A through FIG. 6F. FIG. 11A through FIG. 11F are identical to FIG. 7A through FIG. 7F. Accordingly, the descriptions about FIG. 9A through FIG. 9F, FIG. 10A through FIG. 10F, and FIG. 11A through FIG. 11F are omitted. Moreover, the first photographing scene in FIG. 9A is called a "scene A", the second photographing scene in FIG. 11A is called a "scene B", and the third photographing scene in FIG. 11A is called a "scene C".

Since a process in S401 is identical to the process in S301, its description is omitted. In the above-mentioned first calculation method (FIG. 4), the limited area 500 is set in S302 after S301, and then, the estimation luminance range is determined in S303. Against this, in the second calculation method, a process in S402 corresponding to S303 is performed following the process in S401 without performing a process corresponding to S302 (i.e., no limited area is set).

In S402, the CPU 102 sets an estimation luminance range on the basis of an object distance Df, which is a distance from the lens barrel 118 (lens groups 120) to a face of an object and is obtained from the LPU 119, and a pre-emission light amount C1 obtained from the SCPU 301. Specifically, reflection luminance LVL1 of an object's face that has a standard reflectance (18%) in the object distance Df is calculated as follows.

$$LVL1=-\log_2(Df)\cdot 2+C1$$

Since the reflectances of actual faces are distributed in a range of about 7% through 46% because of individual difference due to race, gender, and age, the exposure has a width of about ±1.4 steps with respect to LV1. Since the reflection luminance of an actual face is estimated to fall within the range of ±1.4 steps with respect to the reflection luminance LVL1 of the standard reflectance (18%), this range shall be the estimation luminance range. Each of FIG. 9F, FIG. 10F, and FIG. 11F shall show an example where a pre-emission reflection luminance of an object of which reflectance is 18% is output as "18". In this case, the estimation luminance range is set to 7 through 46.

The processes in S403 through S406 are identical to the processes in S304 through S307 in the flowchart of FIG. 4. In a series of these processes, blocks outside the estimation luminance range (less than 7, more than 46) are extracted from the blocks in the face area 400 of FIG. 9F, FIG. 10F, and FIG. 11F as the abnormal luminance blocks 600 in S403. Accordingly, the glasses part in FIG. 10G and the beard part in FIG. 11G are extracted as the abnormal luminance blocks 600.

FIG. 9H, FIG. 10H, and FIG. 11H show the examples of the weights for calculating the face reflection luminances FAVE in the scenes A, B, and C, respectively. The weights of the abnormal luminance blocks 600 are set to "0.0". FIG. 9I, FIG. 10I, and FIG. 11I show the examples of the weights for calculating the face ambient light luminances EAVE in the scenes A, B, and C that are determined in S404, respectively. The weights of the abnormal luminance blocks 600 are set to "0.5". In this case, the reflection luminances FAVE become FAVE_A=17 in the scene A, FAVE_B=17 in the scene B, and FAVE_C=18 in the scene C.

It should be noted that the weights of the blocks corresponding to the glasses part and the beard part are preferably reduced when the face ambient light luminance EAVE is calculated also in the second calculation method as well as the first calculation method. Accordingly, the weights for calculating the face ambient light luminance EAVE may be the same as the weights for calculating the face reflection luminance FAVE. However, the influence of the glasses and the beard part on the ambient light is smaller than that on the flash light by the pre-emission. Accordingly, the declines of the weights (FIG. 10I and FIG. 11I) for calculating the face ambient light luminance EAVE are made smaller than the declines of the weights (FIG. 10H and FIG. 11H) for calculating the face reflection luminance FAVE. In the meantime, the weights (FIG. 9I, FIG. 10I, and FIG. 11I) for calculating the face ambient light luminance EAVE may not be reduced even in the abnormal luminance blocks 600. Furthermore, in the case of the second calculation method, the weights may be gradually reduced in accordance with absolute values of the differences between the reflection luminances of the respective blocks and the estimation luminance range.

The exposure changes resulting from the specular reflection of the glasses part in the scene B and the beard part in the scene C can be reduced in this way by using the second calculation method as well as the case where the first calculation method is used.

Incidentally, the estimation luminance range is not only found by the above-mentioned method, but also it can be found from size information of the face area 400 in S402. Specifically, the object distance Df to an object is calculated on the basis of the focal length information about the lens barrel 118 obtained from the LPU 119. The object distance Df is calculated by using $$Df=FL\cdot K1/Wf$$

where FL is focal length information about the lens groups 120. Wf is size information of the detected face area. K1 is a conversion coefficient determined by a size of an actual person's face etc.

Although sizes of actual person's faces are different because of individual difference due to an age, the conversion coefficient K1 is determined on the assumption that a size (width) of a person's face is a standard size (150 mm). A reflection luminance LVL2 of an object's face that has the standard reflectance (18%) in the object distance Df is calculated as follows.

$$LVL2=-\log_2(Df)\cdot 2+C1$$

Since the reflectances of actual faces are distributed in a range of about 7% through 46% because of individual difference due to race, gender, and age, the exposure has a width of about ±1.4 steps with respect to the reflection luminance LV1. Moreover, actual face sizes are distributed in a range of about 120 mm through 185 mm because of individual difference due to race, gender, and age. That is, the exposure varies in a range of about ±0.6 step with respect to the reflection luminance LVL2 corresponding to the standard size (150 mm). Accordingly, since the reflection luminances of an actual face are estimated to fall within a range of about ±2.0 steps with respect to the reflection luminance LVL2[n] corresponding to the standard size (150 mm) and the standard reflectance (18%), this range may be used as the estimation luminance range of a face.

A method for calculating the face reflection luminance FAVE in a case where a plurality of face areas are detected will be described as the common method in the first and second calculation methods. FIG. 12A shows a scene where a plurality of faces (specifically faces of two persons) are detected from the photographing area. In this case, two face areas 400 are detected by the face detection in S204 as shown in FIG. 12B. The processes in S301 through S304 (or S401 through S403) are applied to each of the two face areas 400. Then, when weights are determined in S305 (or S404), weights of all blocks in the face area including abnormal luminance blocks 600 are reduced as shown in FIG. 12D.

Regardless of this, average values of the pre-emission reflection luminances in the respective face areas 400 may be calculated first without performing the calculations in S304 and S305 (or S403 and S404). Then, the average value of the pre-emission reflection luminances within the estimation luminance range is determined as the result of the process in S306 (or S405), i.e., as the face reflection luminance FAVE. Alternatively, a contribution rate for calculating the face reflection luminance FAVE may be reduced in a face area of which an average value is outside the estimation luminance range than a face area of which an average value is included in the estimation luminance range.

Furthermore, even if a plurality of faces are detected by the face detection in S204, when a face (main face) that is mainly focused in the AF process in S103 has no abnormal luminance block 600, the final face reflection luminance FAVE may be determined by using the main face only.

However, when the following first through fourth conditions are satisfied, the final face reflection luminance FAVE may be determined by using a sub face other than a main face that is mainly focused in the AF process in S103. The first condition is that the main face has an abnormal luminance block 600. The second condition is that a plurality of faces are detected by the face detection in S204. The third condition is that the sub face other than the main face is also focused (a defocus amount falls within a certain range or a face size falls within an assumption range). The fourth condition is that the sub face other than the main face has no abnormal luminance block 600.

Figure 13A:
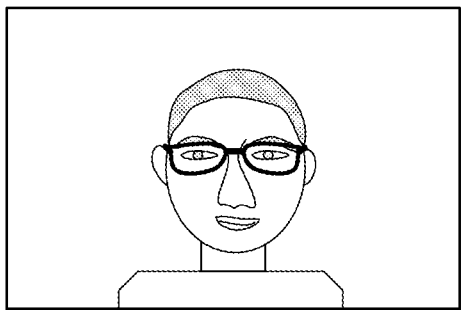
FIG. 13A is a view showing the second photographing scene.
Figure 13B:
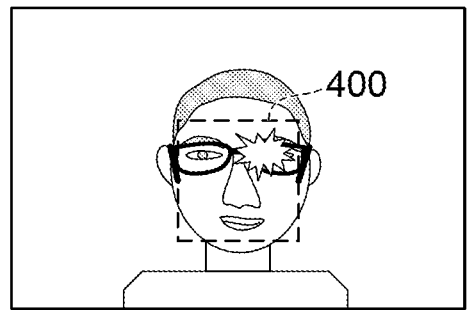
FIG. 13B is view showing a state where glasses shine by pre-emission in the second photographing scene.

Next, a third calculation method for calculating the face reflection luminance FAVE and the face ambient light luminance HAVE in S205 will be described. FIG. 13A shows a scene where one face is detected from a photographing area and is identical to the scene B shown in FIG. 6A. FIG. 13B schematically shows a state where glasses shine by pre-emission with the flash 300. When an abnormal luminance due to specular reflection of the flash light of pre-emission is detected, a possibility of underexposure becomes high because the face reflection luminance is determined brightly. Hereinafter, a solution for obtaining correct exposure in such a scene will be described.

Figure 14:
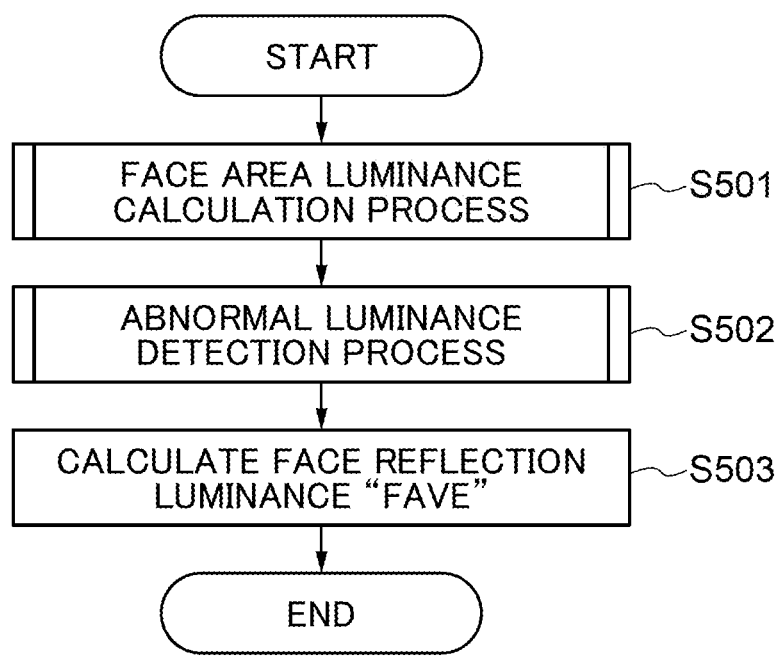
FIG. 14 is a flowchart describing a third calculation method for calculating a face reflection luminance in S205.

FIG. 14 is a flowchart describing the third calculation method for calculating the face reflection luminance FAVE in S205. In S501, the CPU 102 calculates a luminance in the face area 400 detected in S204. Details of the process in S501 will be described below. In S502, the CPU 102 detects whether there is an abnormal luminance and calculates summation values (integration values) of the respective colors of the Bayer array of the photometry sensor 108. Details of the process in S502 will be also described below.

In S503, the CPU 102 calculates the face reflection luminance FAVE by performing the same calculation as S301 using the summation values (integration values) of the respective colors of a Bayer array calculated in S502. Accordingly, this process is finished.

Figure 15:
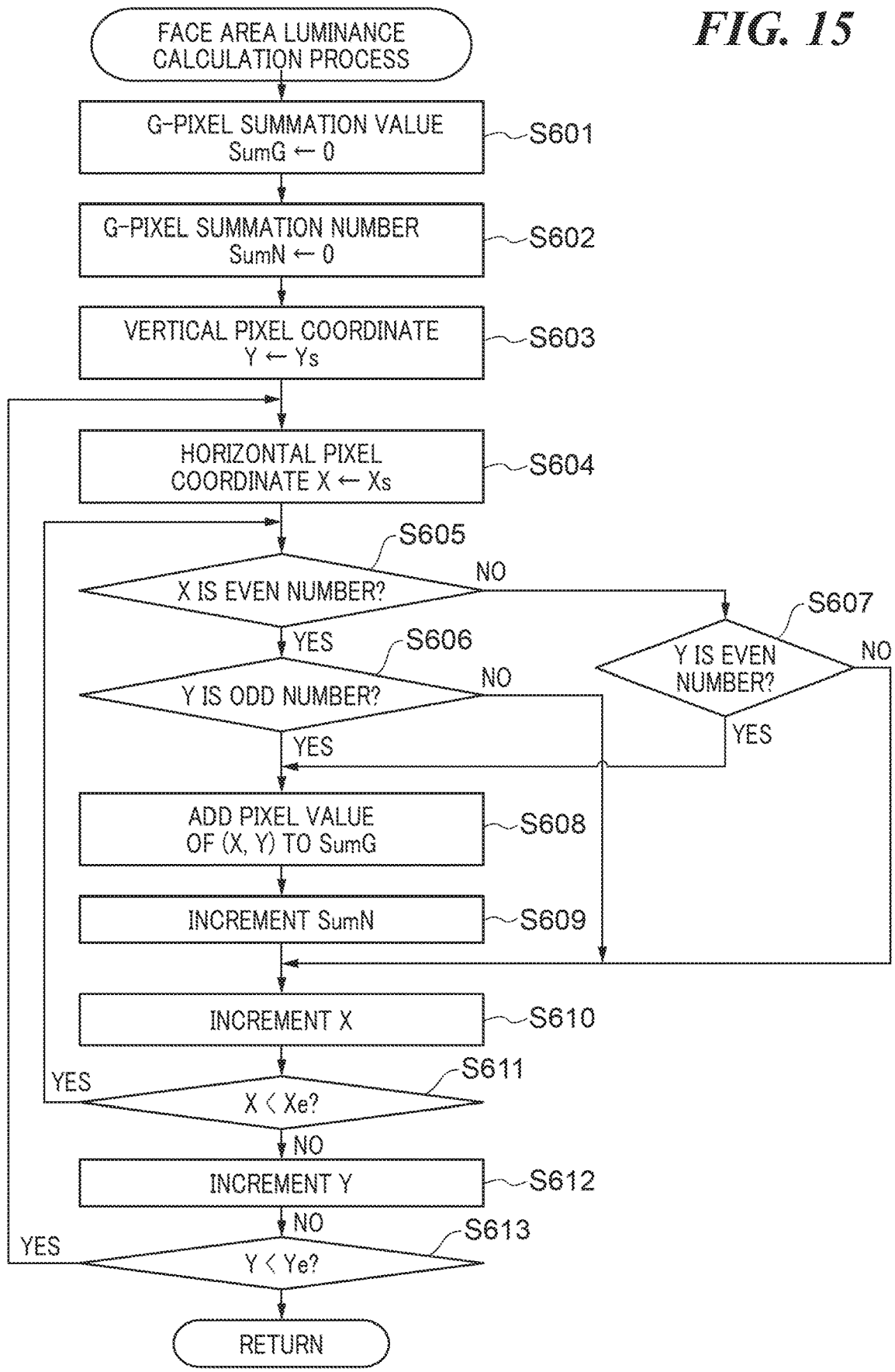
FIG. 15 is a flowchart of the process in S501.
Figure 16:
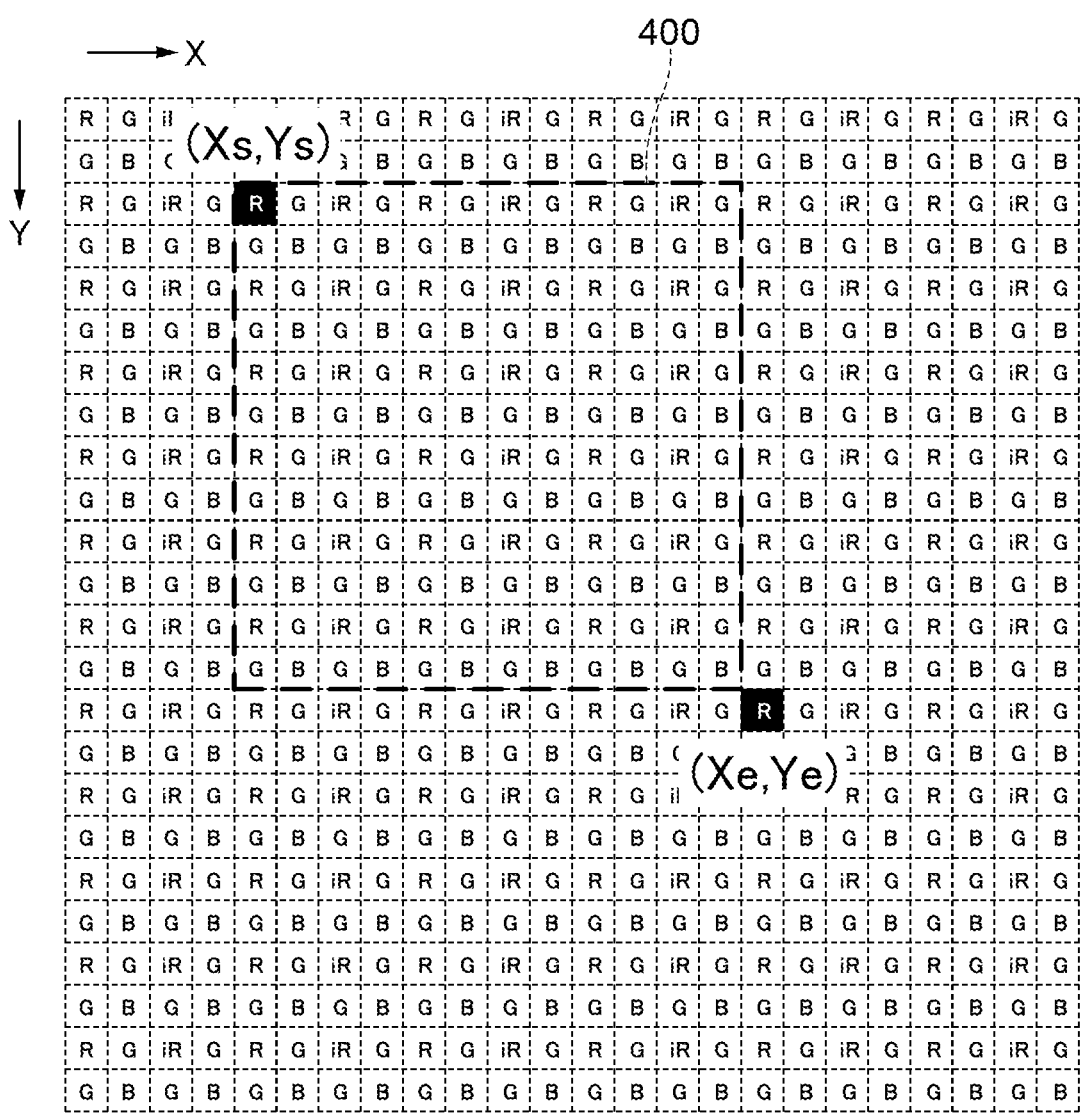
FIG. 16 is a view showing a state where the face area is applied to pixels of a photometry sensor.

FIG. 15 is a flowchart of the process in S501. FIG. 16 is a view showing a state where the detected face area 400 is applied to elements of a color filter corresponding to pixels of the photometry sensor (image sensor) 108.

In S601, the CPU 102 clears a G(green)-pixel summation value SumG to "0". In S602, the CPU 102 clears the G-pixel summation number SumN to "0". In S603, the CPU 102 sets the vertical pixel coordinate Y of the pixel of the upper-left corner of the face area 400 shown in FIG. 16 to "Ys". In S604, the CPU 102 sets the horizontal pixel coordinate X of the pixel of the upper-left corner of the face area 400 shown in FIG. 16 to 'Xs'.

As shown in FIG. 16, the color filter has Bayer arrays of which unit consists of eight pixels (4-column-2-line) of R (red), G, B (blue), and iR (infrared ray) corresponding to pixels of the photometry sensor (image sensor) 108. In order to facilitate the calculation process, the detected face area shall be corrected so that the coordinate (Xs, Ys) will become an R pixel. Moreover, the detected face area shall be corrected so that the below-mentioned coordinate (Xe, Ye) will become an R pixel.

On a line of which the vertical pixel coordinate Y is even, a G pixel is located on a column of which the horizontal pixel coordinate X is odd. On a line of which the vertical pixel coordinate Y is odd, a G pixel is located on a column of which the horizontal pixel coordinate X is even. Accordingly, in order to accumulate the pixel values of G pixels only, determinations in S605 through S607 are performed. In S605, the CPU 102 determines whether X is an even number. When determining that X is an even number (YES in S605), the CPU 102 proceeds with the process to S606. When determining that X is an odd number (NO in S605), the CPU 102 proceeds with the process to S607. In S606, the CPU 102 determines whether Y is an odd number. When determining that Y is an odd number (YES in S606), the CPU 102 proceeds with the process to S608. When determining that Y is an even number (NO in S606), the CPU 102 proceeds with the process to S610. In S607, the CPU 102 determines whether Y is an even number. When determining that is an even number (YES in S607), the CPU 102 proceeds with the process to S608. When determining that is an odd number (NO in S607), the CPU 102 proceeds with the process to S610. Since the pixels of R, G. B, and iR of the color filter are arranged as show n in FIG. 16, the process proceeds to S608 when a target pixel is a G pixel by the processes in S605 through S607.

In S608, the CPU 102 adds the pixel value of the G pixel at the coordinate (X, Y) to the G-pixel summation value SumG. In S609, the CPU 102 increments the G-pixel summation number SumN.

In S610, the CPU 102 increments X. In S611, the CPU 102 determines whether X is less than Xe. The coordinate (Xe, Ye) is the R pixel that is located outside the face area 400 at a diagonal position to the B pixel at the lower right corner of the face area 400 as shown in FIG. 16. Accordingly, in S611, the CPU 102 determines whether X is in the face area 400. When determining that X is less than Xe (YES in S611), the CPU 102 returns the process to S605. When determining that X is not less than Xe (NO in S611), the CPU 102 proceeds with the process to S612.

In S612, the CPU 102 increments Y. In S613, the CPU 102 determines whether Y is less than Ye. Accordingly, in S613, the CPU 102 determines whether Y is in the face area 400. When determining that Y is less than Ye (YES in S613), the CPU 102 returns the process to S604. When determining that Y is not less than Ye (NO in S613), the CPU 102 finishes this process. Thus, the G-pixel summation value SumG that totaled the pixel values of the G pixels calculated in the face area 400 shall be the luminance of the face area 400.

Figure 17:
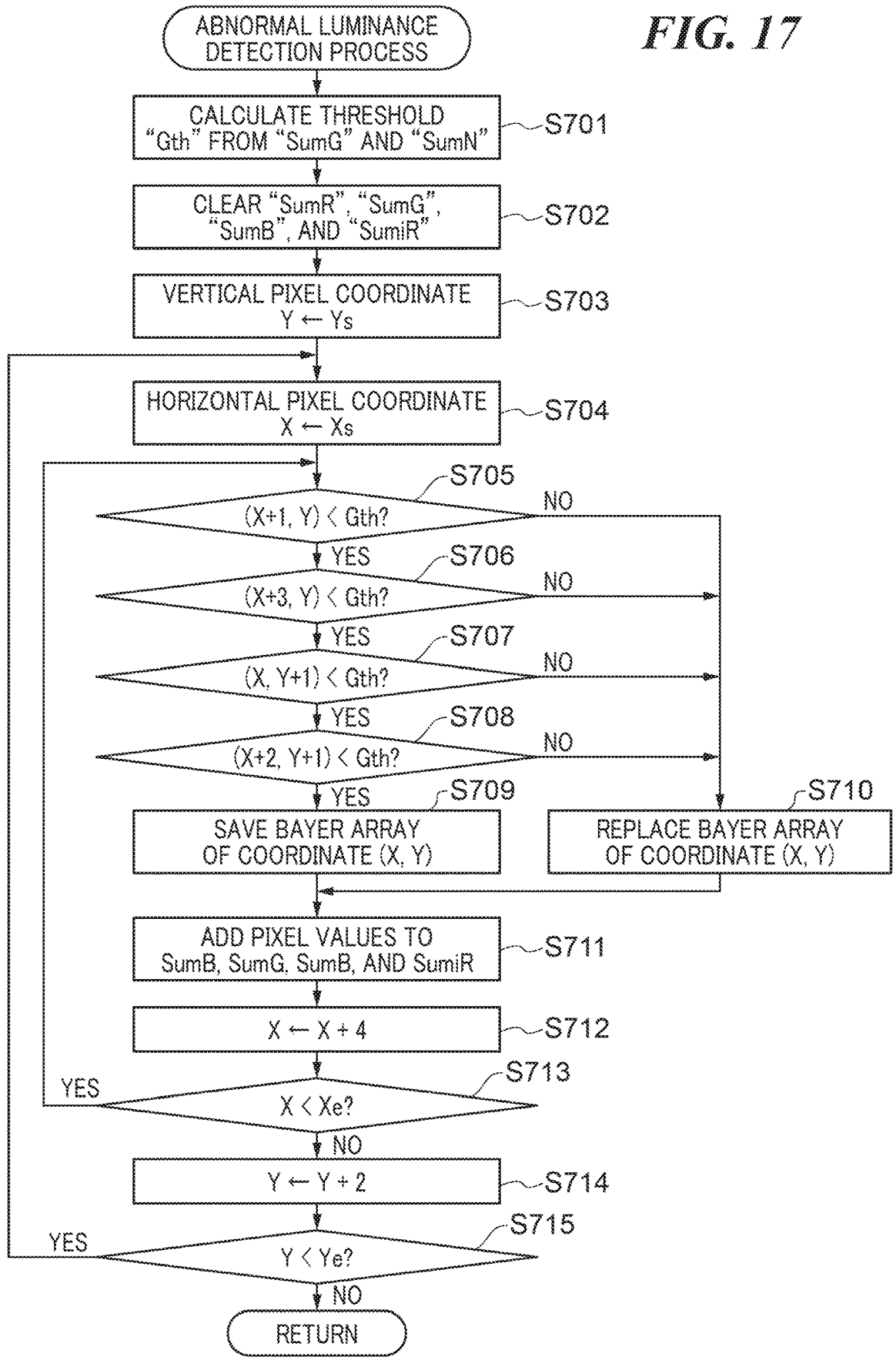
FIG. 17 is a flowchart showing the process in S502.

FIG. 17 is a flowchart of the process in S501. In S701, the CPU 102 calculates a threshold Gth from the G-pixel summation value SumG and the G-pixel summation number SumN that are calculated in S501. The threshold Gth is calculated by the following formula and becomes α times of the average value of the G pixels.

$$Gth = \alpha \cdot SumG/SumN$$

The coefficient cx show mu a predetermined multiple is set so that a luminance more than Gth will become the abnormal luminance.

In S702, the CPU 102 dears each of an R-pixel summation value SumR, the G-pixel summation value SumG, a B-pixel summation Value SumB, and an it summation value SumiR, in order to calculate the summation value for each color. Since the processes in S703 and S704 are identical to the processes in S603 and S604 in FIG. 15, their descriptions are omitted.

Since the initial pixel (Xs, Ys) is the R pixel as shown in the pixel arrangement in FIG. 16, four pixels (X+1, Y), (X+3, Y), (X, Y+1), and (X+2, Y+1) are G pixels. Accordingly, the CPU 102 determines whether the pixel values of the four G pixels (X+1, Y), (X+3, Y), (X, Y+1), and (X+2, Y+1) are less than the threshold Gth in S705, S706, S707, and S708. When determining that all the pixel values of the four G pixels are less than the threshold Gth, the CPU 102 proceeds with the process to S709. When determining that at least one pixel value of the four G pixels is not less than the threshold Gth, the CPU 102 proceeds with the process to S710.

In S709, the CPU 102 saves the pixel values of the Bayer array of the coordinate (X, Y). The Bayer array of the coordinate (X, Y) consists of one R pixel, one iR pixel, two B pixels, and four G pixels (see a Bayer array 700 shown in FIG. 18). S710, the CPU 102 replaces the pixel values of the Bayer array of the coordinate (X, Y) with the saved pixel values.

Figure 18:
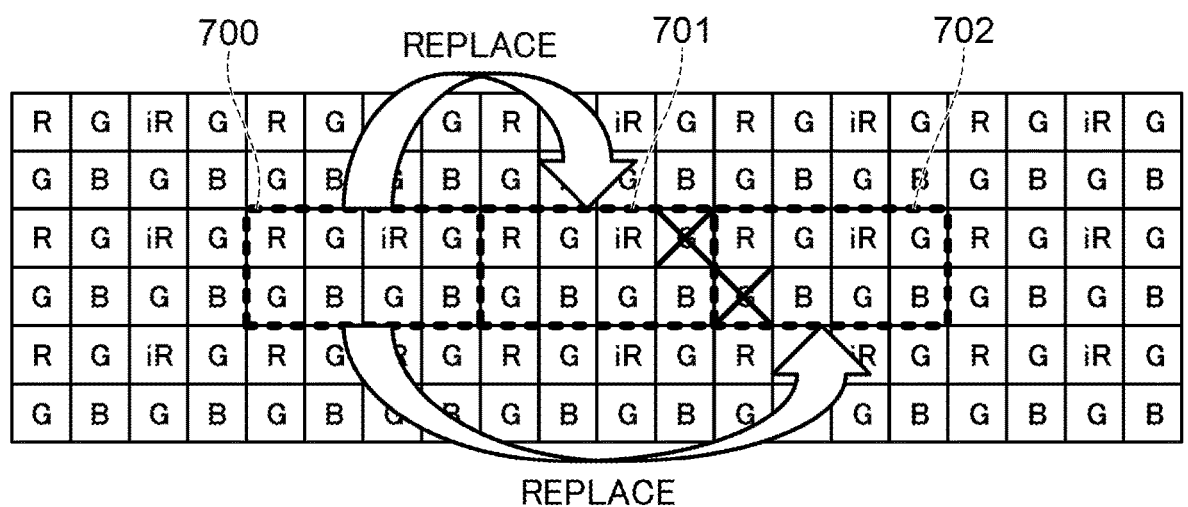
FIG. 18 is a schematic view describing the process in S710.

FIG. 18 is a schematic view describing the process in S710. There is no abnormal luminance in the Bayer array 700. G pixels to which check marks (X) are applied in Bayer arrays 701 and 702 are the pixels that exhibit abnormal luminances more than the threshold Gth. When the processes in S705 through S710 are applied to these Bayer arrays 700, 701, and 702, the Bayer arrays 701 and 702 are replaced with the Bayer array 700. Such processes eliminate the pixels of the abnormal luminances, which enables to calculate a face reflection luminance from the reflection luminances of the face area after replacements.

In S711, the CPU 102 adds the pixel values of the respective colors saved in S709 to the pixel summation values SumR, SumG, SumB, and SumiR for the respective colors. Next, the CPU 102 determines luminances of pixels in the face area 400 per a Bayer array and replaces the luminances if needed by the processes in S712 through S715.

That is, the CPU 102 adds four to X in S712. Thereby, the process target moves to a Bayer array adjacent at the right side of the processed Bayer array that consists of the eight pixels (4-column-2-line) shown in FIG. 18, for example. In S713, the CPU 102 determines whether X is less than Xe. The coordinate (Xe, Ye) is the R pixel that is located outside the face area 400 at the diagonal position to the B pixel at the lower right corner of the face area 400 as mentioned above. Accordingly, in S713, the CPU 102 determines whether X is in the face area 400. When determining that X is less than Xe (YES in S713), the CPU 102 returns the process to S705. When determining that X is not less than Xe (NO in S713), the CPU 102 proceeds with the process to S714.

The CPU 102 adds two to Y. In S715, the CPU 102 determines whether Y is less than Ye. That is, in S715, the CPU 102 determines whether Y is in the face area 400. When determining that Y is less than Ye (YES in S715), the CPU 102 returns the process to S704. Accordingly, the process target moves to a Bayer array that is under the processed Bayer array and is at the left end of the face area 400. When determining that Y is not less than Ye (NO in S613), the CPU 102 finishes this process.

In this embodiment, the abnormal luminance is determined with paying attention to the G pixels only. This enables detection of the abnormal luminance with easy calculation (with a small calculation amount). Moreover, since the replacement is performed by the unit of a Bayer array, a pixel of the abnormal luminance other than a G pixel can be simultaneously replaced.

Although the present invention has been described in detail on the basis of the suitable embodiments, the present invention is not limited to these specific embodiments and includes various configurations that do not deviate from the scope of the present invention. Furthermore, the embodiments mentioned above show examples of the present invention, and it is possible to combine the embodiments suitably.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory, card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 20196155757, filed Aug. 28, 2019, which is hereby incorporated by reference herein in its entirety.

What is claimed is:

1. An image pickup apparatus that enables photographing using a lighting device, comprising:
   a memory device that stores a set of instructions; and
   at least one processor that executes the set of instructions to:
   calculate reflection luminances of reflected light from an object at pre-emission of the lighting device;
   calculate ambient light luminances of the object under ambient light;
   detect a face area from one of an image obtained under the ambient light and an image obtained at the pre-emission of the lighting device;
   divide the face area into blocks;
   calculate a face reflection luminance from a weighted average of the reflection luminances of the blocks and first weights of the blocks;
   calculate a face ambient light luminance from a weighted average of the ambient light luminances of the blocks and second weights of the blocks;
   set a predetermined luminance range in accordance with an average of reflection luminances of blocks corresponding to a limited area set in the face area among the blocks; and
   determine an emission amount of the lighting device for main photographing using the face reflection luminance and the face ambient light luminance, wherein the first weight of an abnormal luminance block of which a reflection luminance does not fall within the predetermined luminance range among the blocks is reduced to be lower than the first weight of a block other than the abnormal luminance block in the calculation of the face reflection luminance.

2. The image pickup apparatus according to claim 1, wherein the limited area is set in a lower area in a vertical direction in the face area.

3. The image pickup apparatus according to claim 1, wherein the limited area corresponds to at least one of areas near a forehead, cheeks, and a nose of a face in the face area.

4. The image pickup apparatus according to claim 1, wherein the at least one processor executes the set of instructions to:
set an estimation luminance range in which the reflection luminances in the face area are estimated to be distributed in accordance with the reflection luminances;
set the abnormal luminance block of which the reflection luminance does not fall within the estimation luminance range among the blocks; and
reduce a second weight of the abnormal luminance block in accordance with the first weight of the abnormal luminance block.

5. The image pickup apparatus of the claim 4, wherein the at least one processor executes the set of instructions to set the estimation luminance range in accordance with an emission light amount at the pre-emission of the lighting device and a distance to the object.

6. The image pickup apparatus according to claim 4, wherein the estimation luminance range is determined by at least one of an emission amount of the pre-emission, information about a distance to the object, a reflectance range of human skin, a size of a face, a sensitivity and an aperture of the image pickup apparatus, an exposure including an accumulation period of an image pickup unit.

7. The image pickup apparatus of the claim 1, wherein the at least one processor executes the set of instructions to reduce the first weights of the blocks in the face area that includes the abnormal luminance block in a case where a plurality of face areas is detected.

8. The image pickup apparatus of the claim 1, wherein the at least one processor executes the set of instructions to calculate the face reflection luminance using reflection luminances in a face area of a sub face other than a main face that is focused in a case where following four conditions are satisfied:
(1) a plurality of face areas is detected,
(2) the face area of the main face includes the abnormal luminance block,
(3) the sub face is also focused, and
(4) the face area of the sub face includes no abnormal luminance block.

9. An image pickup apparatus that enables photographing using a lighting device, comprising:
a memory device that stores a set of instructions; and
at least one processor that executes the set of instructions to:
calculate reflection luminances of reflected light from an object at pre-emission of the lighting device;
calculate ambient light luminances of the object under ambient light;
detect a face area from one of an image obtained under the ambient light and an image obtained at the pre-emission of the lighting device;
calculate a face ambient light luminance in the face area from the ambient light luminances;
calculate a face reflection luminance in the face area from the reflection luminances;
set an estimation luminance range in which the reflection luminances in the face area are estimated to be distributed in accordance with the reflection luminances; and
determine an emission amount of the lighting device for main photographing using the face reflection luminance and the face ambient light luminance,
wherein a contribution rate for calculating the face reflection luminance in a face area that is outside the estimation luminance range is reduced to be lower than that in a face area that is in the estimation luminance range in a case where a plurality of face areas are is detected.

10. The image pickup apparatus according to claim 9, wherein the estimation luminance range is determined by at least one of an emission amount of the pre-emission, information about a distance to the object, a reflectance range of human skin, a size of a face, a sensitivity and an aperture of the image pickup apparatus, an exposure including an accumulation period of an image pickup unit.

11. An image pickup apparatus that enables photographing using a lighting device, comprising:
a memory device that stores a set of instructions; and
at least one processor that executes the set of instructions to:
calculate reflection luminances of reflected light from an object at pre-emission of the lighting device;
calculate ambient light luminances of the object under ambient light;
detect a face area from one of an image obtained under the ambient light and an image obtained at the pre-emission of the lighting device;
calculate a face ambient light luminance in the face area from the ambient light luminances;
calculate a face reflection luminance in the face area from the reflection luminances;
set an estimation luminance range in which the reflection luminances in the face area are estimated to be distributed in accordance with the reflection luminances; and
determine an emission amount of the lighting device for main photographing using the face reflection luminance and the face ambient light luminance,
wherein the face reflection luminance is calculated using the reflection luminances in the face area of a main face that is focused in a case where a plurality of the face areas is detected and the reflection luminances in the face area of the main face fall within the estimation luminance range, and
wherein the face reflection luminance is calculated using the reflection luminances in a face area of a sub face other than the main face in a case where a plurality of the face areas is detected and the reflection luminances in the face area of the main face do not fall within the estimation luminance range.

12. The image pickup apparatus according to claim 11, wherein the estimation luminance range is determined by at least one of an emission amount of the pre-emission, information about a distance to the object, a reflectance range of human skin, a size of a face, a sensitivity and an aperture of the image pickup apparatus, an exposure including an accumulation period of an image pickup unit.

13. An image pickup apparatus that enables photographing using a lighting device, comprising:
a memory device that stores a set of instructions; and at least one processor that executes the set of instructions to:
  detect a face area from one of an image obtained under the ambient light and an image obtained at the pre-emission of the lighting device;
  calculate an average luminance in the face area from the image obtained at the pre-emission of the lighting device;
  calculate ambient light luminances of an object under ambient light;
  calculate a threshold for determining an abnormal luminance from the average luminance;
  determine the abnormal luminance using the threshold;
  replace a Bayer array that is determined to have the abnormal luminance with a Bayer array determined not to have the abnormal luminance;
  calculate a face reflection luminance from reflection luminances in the face area after replacement;
  calculate a face ambient light luminance in the face area from the ambient light luminances; and
  determine an emission amount of the lighting device for main photographing using the face reflection luminance and the face ambient light luminance.

14. The image pickup apparatus of the claim 13, wherein the at least one processor executes the set of instructions to set the threshold to a predetermined multiple of the average luminance.

15. The image pickup apparatus according to claim 13, wherein the at least one processor executes the set of instructions to:
  calculate the face reflection luminance from the reflection luminances of green pixels in the face area after the replacement;
  calculate the face ambient light luminance from the ambient light luminances of the green pixels in the face area after the replacement; and
  determine the emission amount of the lighting device for the main photographing using the face reflection luminance based on the green pixels and the face ambient light luminance based on the green pixels.

16. A control method for an image pickup apparatus, the control method comprising:
  calculating reflection luminances of reflected light from an object at pre-emission of a lighting device;
  calculating ambient light luminances of the object under ambient light;
  detecting a face area from one of an image obtained under the ambient light and an image obtained at the pre-emission of the lighting device;
  dividing the face area into blocks;
  calculating a face reflection luminance from a weighted average of the reflection luminances of the blocks and first weights of the blocks;
  calculating a face ambient light luminance from a weighted average of the ambient light luminances of the blocks and second weights of the blocks;
  setting a predetermined luminance range in accordance with an average of reflection luminances of blocks corresponding to a limited area set in the face area among the blocks; and
  determining an emission amount of the lighting device for main photographing using the face reflection luminance and the face ambient light luminance,
  wherein the first weight of an abnormal luminance block of which a reflection luminance does not fall within the predetermined luminance range among the blocks is reduced to be lower than the first weight of a block other than the abnormal luminance block in the calculation of the face reflection luminance.

17. A control method for an image pickup apparatus, the control method comprising:
  calculating reflection luminances of reflected light from an object at pre-emission of a lighting device;
  calculating ambient light luminances of the object under ambient light;
  detecting a face area from one of an image obtained under the ambient light and an image obtained at the pre-emission of the lighting device;
  calculating a face ambient light luminance in the face area from the ambient light luminances;
  calculating a face reflection luminance in the face area from the reflection luminances;
  setting an estimation luminance range in which the reflection luminances in the face area are estimated to be distributed in accordance with the reflection luminances; and
  determining an emission amount of the lighting device for main photographing using the face reflection luminance and the face ambient light luminance,
  wherein a contribution rate for calculating the face reflection luminance of a face area that is outside the estimation luminance range is reduced to be lower than that of a face area that is in the estimation luminance range in a case where a plurality of face areas is detected.

18. A control method for an image pickup apparatus, the control method comprising:
  calculating reflection luminances of reflected light from an object at pre-emission of a lighting device;
  calculating ambient light luminances of the object under ambient light;
  detecting a face area from one of an image obtained under the ambient light and an image obtained at the pre-emission of the lighting device;
  calculating a face ambient light luminance in the face area from the ambient light luminances;
  calculating a face reflection luminance in the face area from the reflection luminances;
  setting an estimation luminance range in which the reflection luminances in the face area are estimated to be distributed in accordance with the reflection luminances; and
  determining an emission amount of the lighting device for main photographing using the face reflection luminance and the face ambient light luminance,
  wherein the face reflection luminance is calculated using the reflection luminances of the face area of a main face that is focused in a case where a plurality of the face areas is detected and the reflection luminances of the face area of the main face fall within the estimation luminance range, and
  wherein the face reflection luminance is calculated using the reflection luminances of a face area of a sub face other than the main face in a case where a plurality of the face areas is detected and the reflection luminances of the face area of the main face do not fall within the estimation luminance range.

19. A control method for an image pickup apparatus, the control method comprising:
  detecting a face area from one of an image obtained under the ambient light and an image obtained at the pre-emission of the lighting device;

calculating an average luminance in the face area from the image obtained at the pre-emission of the lighting device;
calculating ambient light luminances of the object under ambient light;
calculating a threshold for determining an abnormal luminance from the average luminance;
determining the abnormal luminance using the threshold;
replacing a Bayer array that is determined to have the abnormal luminance with a Bayer array determined not to have the abnormal luminance;
calculating a face reflection luminance from reflection luminances in the face area after replacement;
calculating a face ambient light luminance in the face area from the ambient light luminances; and
determining an emission amount of the lighting device for main photographing using the face reflection luminance and the face ambient light luminance.

\* \* \* \* \*